US012473188B2

(12) United States Patent
Chang et al.

(10) Patent No.: US 12,473,188 B2
(45) Date of Patent: Nov. 18, 2025

(54) BEVERAGE DISPENSING MACHINE AND POUCH FOR USE WITH BEVERAGE DISPENSING MACHINE

(71) Applicant: LNJ Group, LLC, Glen Head, NY (US)

(72) Inventors: Marshal Chang, Westminster, MD (US); Jeremy M Fallis, Jr., Bethlehem, PA (US); Brian Orme, Phoenixville, PA (US)

(73) Assignee: LNJ Group, LLC, Glen Head, NY (US)

( * ) Notice: Subject to any disclaimer, the term of this patent is extended or adjusted under 35 U.S.C. 154(b) by 0 days.

(21) Appl. No.: 18/166,099

(22) Filed: Feb. 8, 2023

(65) Prior Publication Data

US 2024/0002208 A1 Jan. 4, 2024

Related U.S. Application Data

(63) Continuation of application No. 16/553,168, filed on Aug. 27, 2019, now Pat. No. 11,608,259.

(60) Provisional application No. 62/723,068, filed on Aug. 27, 2018.

(51) Int. Cl.
*B67D 1/08* (2006.01)
*B67D 1/00* (2006.01)

(52) U.S. Cl.
CPC ......... *B67D 1/0869* (2013.01); *B67D 1/0004* (2013.01); *B67D 1/0809* (2013.01); *B67D 1/0895* (2013.01)

(58) Field of Classification Search
CPC ............... B67D 1/0869; B67D 1/0004; B67D 1/0809; B67D 1/0895; B01F 2215/0072; A47J 31/407; A47J 31/4492; A47J 31/0642
USPC .............................. 222/146.1; 99/323.1, 295
See application file for complete search history.

(56) References Cited

U.S. PATENT DOCUMENTS

| 4,204,613 | A | * | 5/1980 | Terzian | ................. | B67D 3/0009 |
| | | | | | | 165/169 |
| 4,829,771 | A | * | 5/1989 | Koslow | ................... | F25B 21/02 |
| | | | | | | 62/3.64 |
| 9,695,030 | B2 | * | 7/2017 | Walker | ................. | B67D 1/0041 |
| 10,040,042 | B2 | * | 8/2018 | Showalter | ............. | B65D 35/242 |
| 10,976,109 | B2 | * | 4/2021 | Gan | .......................... | F28D 3/00 |

(Continued)

FOREIGN PATENT DOCUMENTS

EP 3213662 A1 * 9/2017
WO WO-2012007313 A1 * 1/2012 .......... A47J 31/4482

*Primary Examiner* — Charles P. Cheyney
(74) *Attorney, Agent, or Firm* — Meister Seelig & Fein PLLC

(57) ABSTRACT

A beverage dispensing device includes a housing, a receptacle, means for opening a beverage dispenser, a thermoelectric cooler, an aeration component, and a discharge nozzle. The housing has a flow path. The receptacle is for receiving a beverage container that houses a beverage and for discharging wine into the flow path. The means for opening the beverage container is for releasing beverage from the beverage container. The thermoelectric cooler is positioned in the housing for one of chilling or warming the beverage along the flow path. The aeration component is for aerating wine in the flow path. The discharge nozzle is coupled to the flow path for dispensing the beverage from the housing.

20 Claims, 35 Drawing Sheets

(56) References Cited

U.S. PATENT DOCUMENTS

| | | | |
|---|---|---|---|
| 11,667,508 B2* | 6/2023 | Abeygunawardana | B67D 1/16 |
| | | | 222/108 |
| 2015/0050392 A1* | 2/2015 | Stonehouse | A47J 31/407 |
| | | | 426/115 |
| 2015/0079240 A1* | 3/2015 | Lo Foro | A47J 31/407 |
| | | | 426/115 |
| 2016/0175783 A1* | 6/2016 | Jarrousse | B01F 23/2362 |
| | | | 261/130 |
| 2018/0362326 A1* | 12/2018 | Jarrousse | B67D 3/0032 |
| 2021/0251419 A1* | 8/2021 | Mori | A47J 31/4403 |

* cited by examiner

Step 1: Touch Button to turn on the machine & open the pouch door

Step 2: Insert Pouch

Step 3: Touch button to close door & start cycle

Step 4: Finished

To Clean: Press & hold button to run rinse cycle

Dump out rinse cycle water

Dispose of empty pouches

Indicator turns red when needs emptying

For Deep Clean: Refill water reservoir

Clean discard bin, decanter, water reservoir & pouch bin

Step 1: Touch button to turn on the machine and open the pouch door.
Start up--Light rotates around button indicating internal processing, not yet ready for pouch insertion Step 2: Insert Pouch
Ready--Light becomes solid or fades in and out before pouch is inserted to indicate readiness/ waiting Step 3: Touch button to close door and start cycle
Processing--Light glows solid and bright when button is pressed to show confirmation Step 4: Finished! Completion--Light blinks twice, then stays solid to indicate completion of the process

BEVERAGE DISPENSING MACHINE AND POUCH FOR USE WITH BEVERAGE DISPENSING MACHINE

CROSS-REFERENCE TO RELATED APPLICATIONS

This application is a continuation of U.S. patent application Ser. No. 16/553,168, filed on Aug. 27, 2019, entitled "BEVERAGE DISPENSING MACHINE AND POUCH FOR USE WITH BEVERAGE DISPENSING MACHINE" which claims priority to U.S. Provisional Application No. 62/723,068, filed on Aug. 27, 2018, entitled "BEVERAGE DISPENSING MACHINE AND POUCH FOR USE WITH BEVERAGE DISPENSING MACHINE" the disclosures of which are incorporated herein by reference in their entirety.

FIELD

The technology described herein relates to a beverage dispensing machine and a pouch for use with the beverage dispensing machine. In particular, the technology concerns a wine dispensing machine and a pouch for holding a single serving of wine.

BACKGROUND

Wine is a favorite evening and bar product for many adults. The top 30% of drinkers in the United States have on average one glass of wine per day. A standard bottle of wine holds 750 ml or 25.4 oz., which is equivalent to approximately six glasses of wine. Thus, the wine consumer will typically have 3-6 days with the same bottle of wine.

Consumers often store bottles of wine in the refrigerator or on kitchen shelves. White wine is usually served chilled at a temperature of about 43 degrees F. (7 degrees C.). Red wines should be served at a temperature that is slightly below room temperature at a temperature of about 64 degrees F. (18 degrees C.) (except for specific varietals, such as Zinfandel or Lambrusco). For wine to be fully appreciated, it is desired to be served under appropriate conditions, including optimum temperature.

Consumers often desire to decant or aerate wine before consuming it to allow it to breathe. Various devices have been created to permit aeration of wine in a quick manner, such that decanting is not necessary.

The single serve beverage category is expanding due to added consumer convenience and other factors. Some manufacturers have begun selling single-serve wines in small bottles or hard containers, such as wine glasses that include a removable seal around the opening. Several manufacturers are selling single serve wine in soft pouches. Others sell single serve brick packs of wine.

U.S. patent Ser. No. 10/035,111 to 10-Vins describes a machine for preparing wine. It includes a liquid flow pipe that is cooled using a well-known Peltier cooling device. After the wine reaches a proper temperature, the wine flows down the liquid flow pipe through an aerating device before it is dispensed through a nozzle. The aeration occurs downstream from the cooling. The liquid remains in the pipe and the wine is cooled by conduction through the pipe wall.

SUMMARY

A beverage dispensing machine and associated beverage containing pouch are disclosed and described herein.

BRIEF DESCRIPTION OF THE DRAWING FIGURES

DETAILED DESCRIPTION

Figure 1:
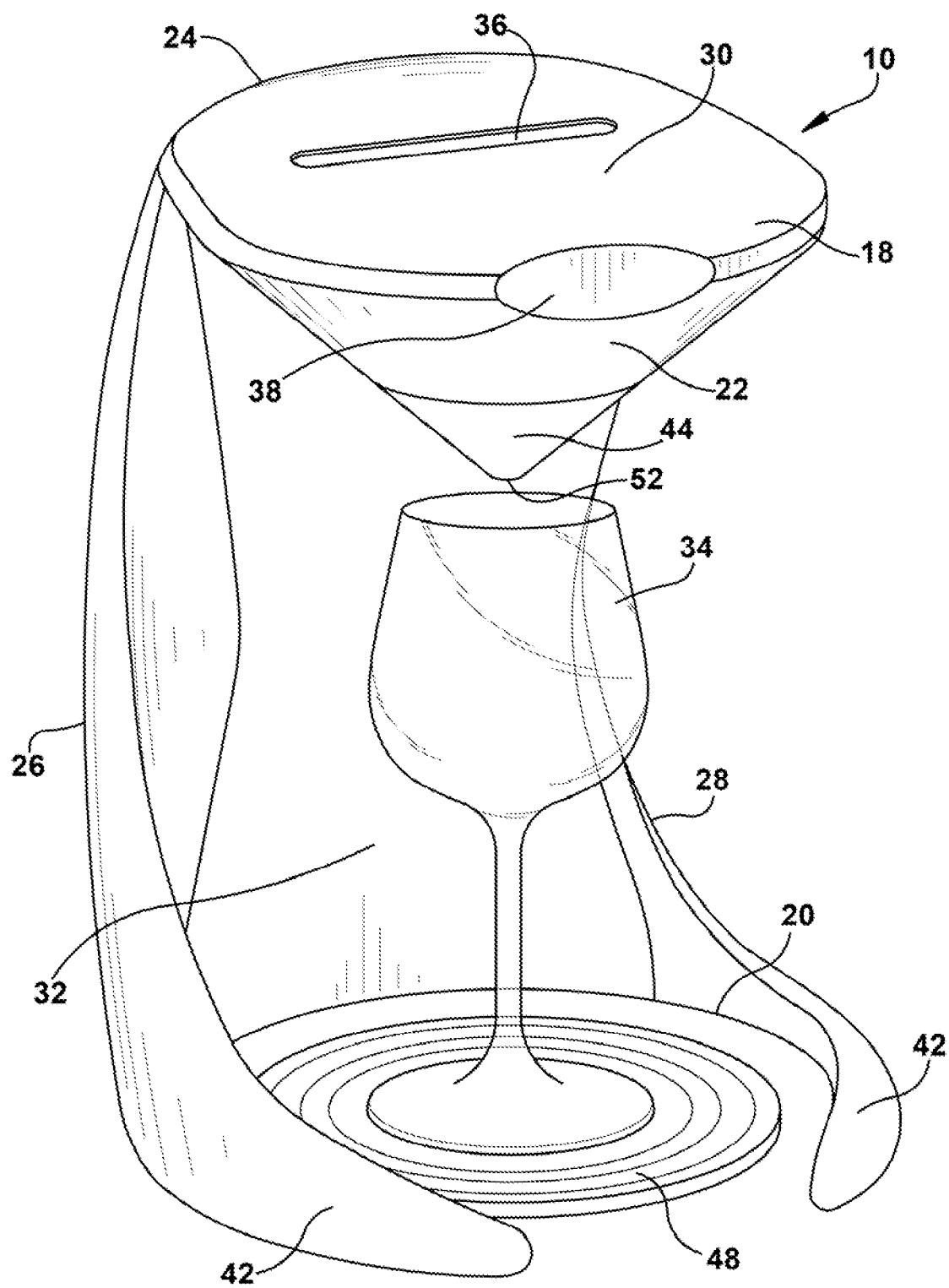
FIG. 1 is a perspective view of on example wine dispensing device of the invention.
Figure 2:
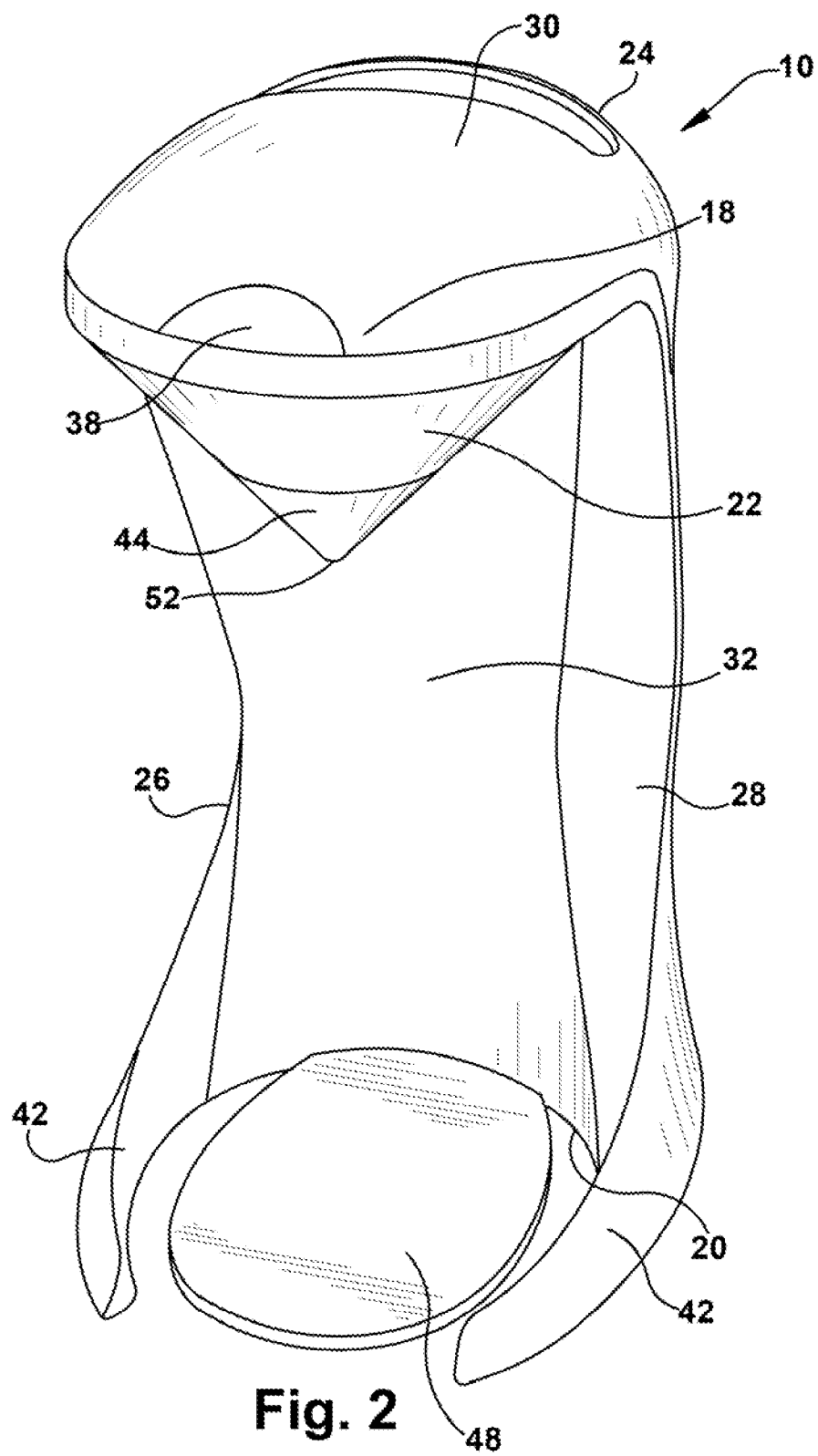
FIG. 2 is a front perspective views of an alternative embodiment of the wine dispensing device of the invention.
Figure 4:
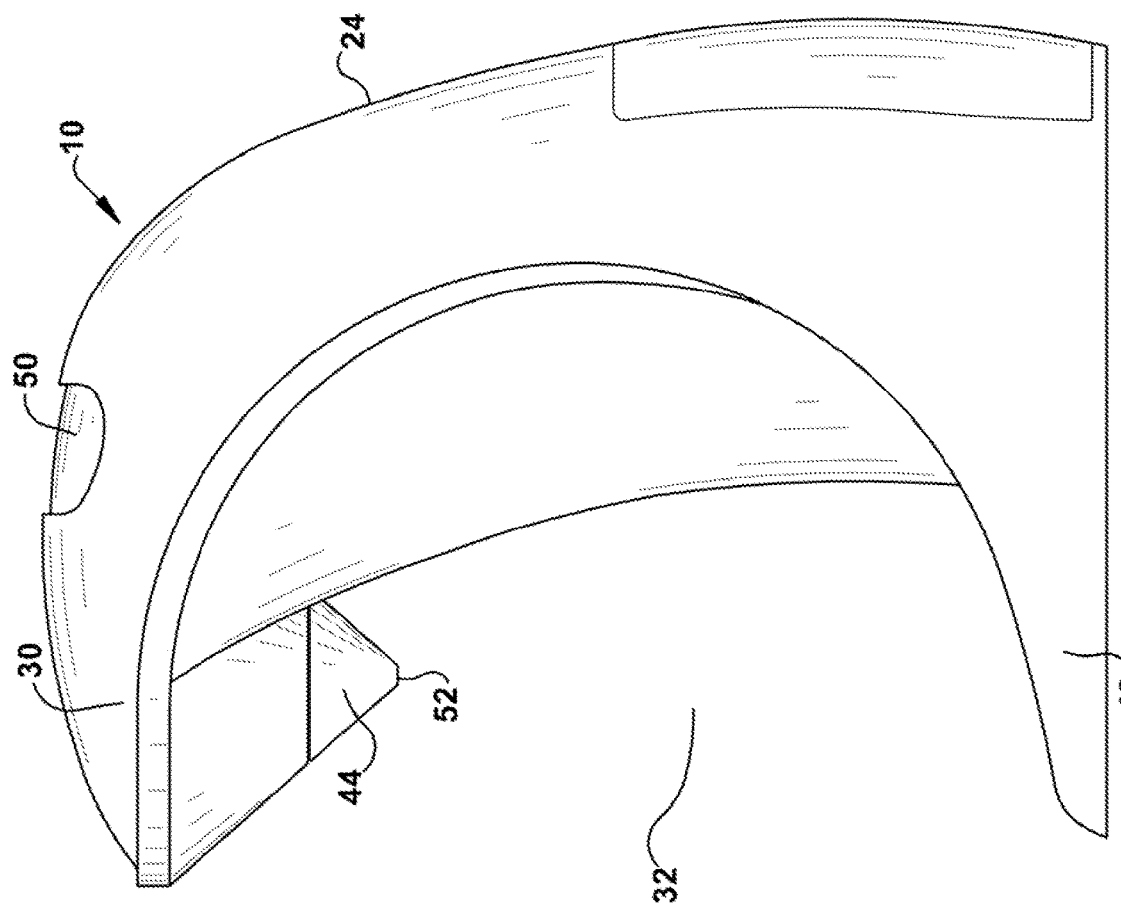
FIG. 4 is a side view of the device of FIG. 2, with the opposite side being a mirror image thereof.
Figure 3:
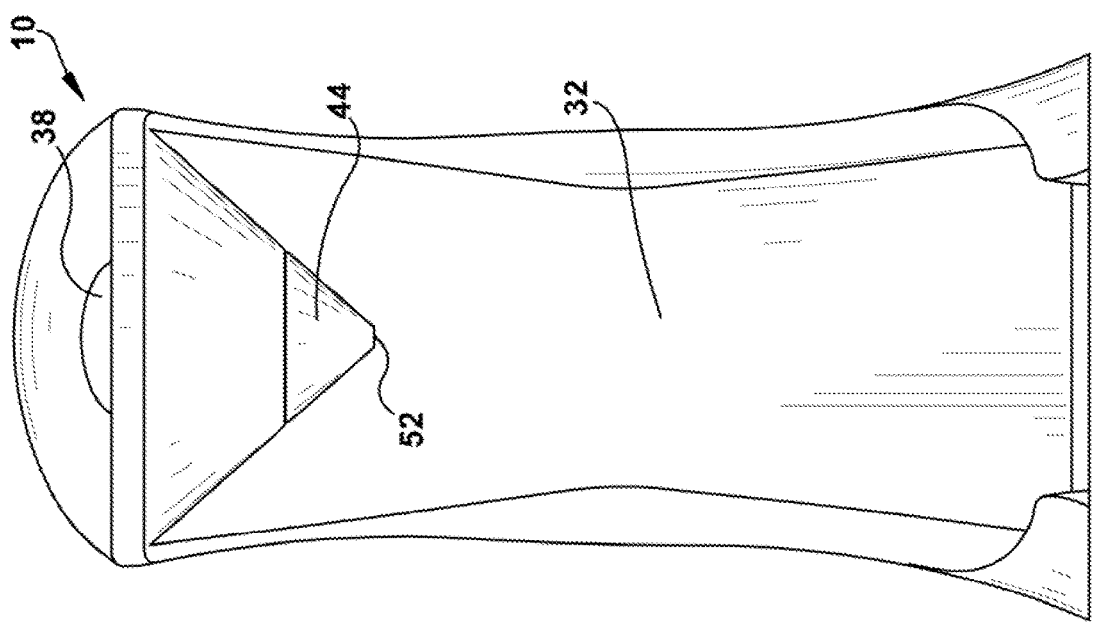
FIG. 3 is a front view of the device of FIG. 2.

Wine consumption is on the rise in the United States, largely due to the Millennial market. Wine drinkers' motives for choosing wine over other alcoholic beverages primarily revolves around relaxation and socialization.

The technology described herein relates to a single-serve wine dispensing device 10 and system that can be used by an ordinary consumer and stored on a countertop under the upper cabinets in the kitchen. The device 10 is intended for both daily and occasional use. The device 10 is preferably quiet and has a height under 18" and a depth that is less than 24". The system may include four features, including chilling (and warming), aerating, serving, and preserving of wine. Other features may also be provided, if desired.

The flexible packaging market continues to grow due to its convenience and portability. The flexible packaging segment is the largest segment worldwide comprising 29% of all packaging types. One type of flexible packaging is a pouch 12, such as a four-sided pouch or a pouch with a bottom gusset. Pouches 12 with a bottom gusset typically will stand up while four-sided pouches typically cannot stand up. The pouch 12 for use with the herein described wine dispensing device 10 utilizes a barrier film that can be used to seal the wine, alcohol, or other beverages in the pouch 12 with an acceptable shelf-life.

The wine dispensing device 10 is utilized with a pre-filled beverage pouch 12. The filled beverage pouch 12 is designed to hold a wine product and to have a shelf-life of at least 18 months-24 months. The wine pouches 12 are made with flexible packaging in the form of soft pouches 12 that do not have any hard parts. They are portable and easy to use. The flexible packaging may be of any known type, as long as it is mechanically openable and provides the appropriate amount of preservation for the contents of the pouch 12.

Techniques for opening soft pouches are known from U.S. Pat. No. 9,695,030, which issued on Jul. 4, 2017. The disclosure of U.S. Pat. No. 9,695,030 is incorporated herein by reference in its entirety. Opening techniques may include slicing, cutting, piercing, squeezing, and piercing at multiple locations, including on the side and/or bottom of the pouch 12. One or more blades 14 may be used for cutting. One or more piercers 16 may be used for piercing. In addition, techniques for opening non-soft pouches are disclosed and may be utilized with the wine dispensing device 10 described herein, if desired. These include molded containers that have at least one end that is soft, permitting the end or ends to be opened with any of the techniques described. Example shapes include bottles, cups, and test tube-shapes, among other known shapes. The molded containers may themselves be openable by the techniques described in the patent.

Referring to the figures, FIG. 1 depicts a first embodiment of the wine dispensing device 10. The wine dispensing device 10 has a housing with a top end 18, a bottom end 20, a front 22, a rear 24, a left side 26 and a right side 28. A head 30 that houses some of the inner workings of the device 10 is positioned at the top end 18. A recess 32 is provided in the center of the front of the housing for accepting a wine glass 34 and for dispensing wine into the wine glass. The recess is positioned directly under the head. The recess is sized to accept a standard wine glass, such as a 9.8" tall wine glass. The recess in the housing may also accept shorter glasses. The recess is partially surrounded by the housing but is open at the front thereof for accepting a wine glass into the space of the recess.

The device 10 includes a pouch loading slot or opening 36 positioned on the head. The slot is positioned on an upper surface at the top end of the housing. The slot is sized for accepting a pouch 12 of wine. The device 10 has a user interface 38 positioned at the front of the head at the top end of the device 10. The user interface 38 is shown as being a simple one-touch button, but could be multiple buttons or other interfaces, such as a touch screen.

The user interface 38 can include LED light indicators where lighting indicates different steps in the process. The button 38 may include a ring of LED lights that surround the button 38. The LED lights may move around the button 38 so that different areas of the button may light up. The button itself may light up with one or more colors. The device 10 may also include lighting that is used to showcase the wine glass, such as lights that shine upwardly on the glass or downwardly on the glass. Lighting could also be used to light the water reservoir 40 or to indicate that the reservoir is empty or near empty.

Legs 42 of the housing extend forward from the left and right sides of the housing and surround at least in part the recess where the wine glass is received. The legs help to support the device 10 and are positioned substantially at the lower end of the device 10. The head of the housing includes a discharge nozzle 44 that is positioned on a lower side of the head at the upper end of the recess of the housing. The discharge nozzle permits wine to exit the device 10. The discharge nozzle has a funnel-like shape that imparts some turbulence to the wine and can provide some decanting. While not shown, the rear surface of the device 10 may include a discard bin 46 that is used to capture emptied pouches 12.

Figure 9:
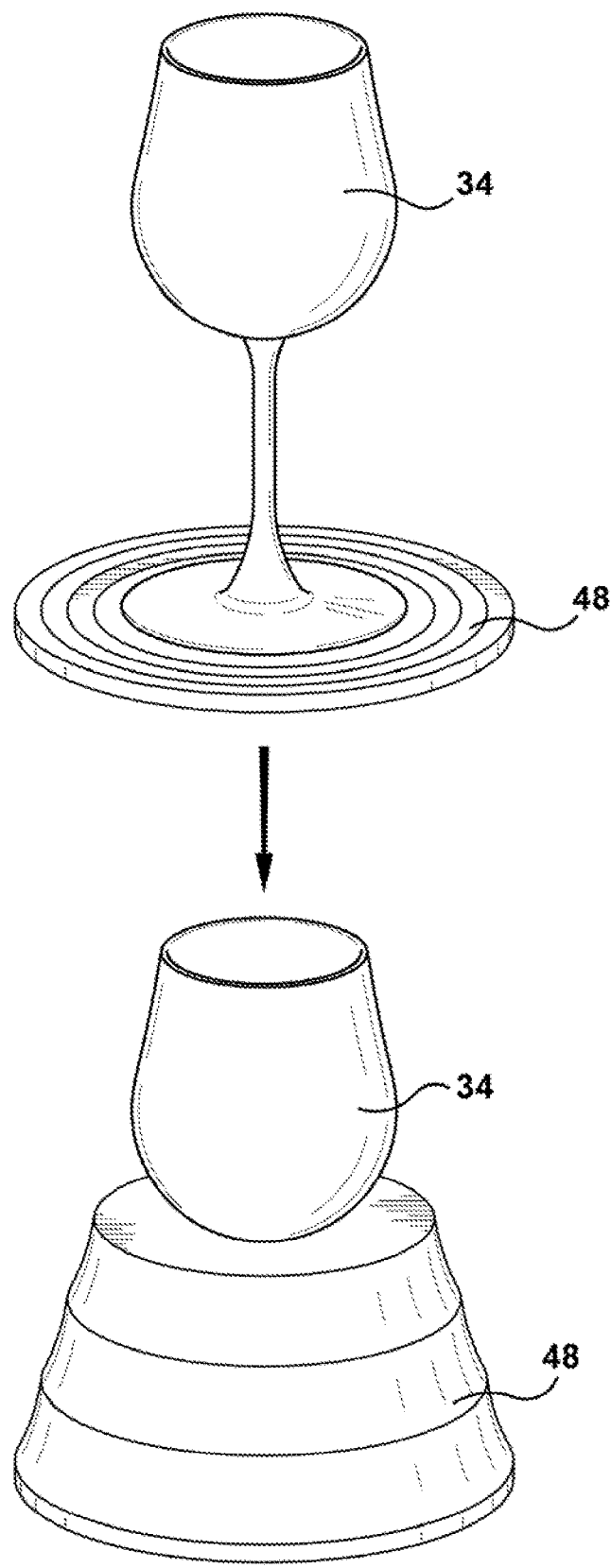
FIG. 9 is an alternative device for adjusting the tray height of the device, where an adjustable, expandable base member is utilized to provide different heights.

The device 10 of FIG. 1 includes a separate base member 48 that is positioned under the nozzle 44 for catching any spilled wine. The base member can also be raised by expanding upwardly to provide a bench for seating a wine glass at a position above the bottom. It is advantageous to have the opening to the wine glass positioned near the dispensing nozzle to avoid splashing. An extended version of the base member 48 is shown in FIG. 9, which shows a first height, which is the lowest height, and a second height, which is higher than the lowest height. The base member is cup-shaped and expands upwardly to provide different heights. The base member shown has three separate heights, but could have fewer or lesser heights, if desired. The base member may be designed in any known manner as long as it provides different heights. If desired, while not shown, different base members could be provided, with each having its own height, such that the base members are not expandable.

FIGS. 2-5 depict another wine dispensing device 10 that is similar to the device 10 shown in FIG. 1. This device 10 also has a top end, a bottom end, a front and a rear, and a left and a right side. The head is provided at the top end and is rounded. A slot for receiving a wine pouch 12 is disposed towards the rear of the head. The slot can be a door 50 that translates forwardly and rearwardly by the operation of a motor, such as a servo. Alternatively, the door may be manually operated by a user. A discard bin area is shown as being positioned on the rear of the device 10. The device 10 has a height of about 16.75", a width of about 9", and a depth of about 13.7", making it sized to be easily received on a kitchen counter and stored under the upper kitchen cabinets. The device 10 has a recess in the front for receiving a wine glass, and a nozzle positioned under the head for dispensing liquid from the device 10.

Figure 5:
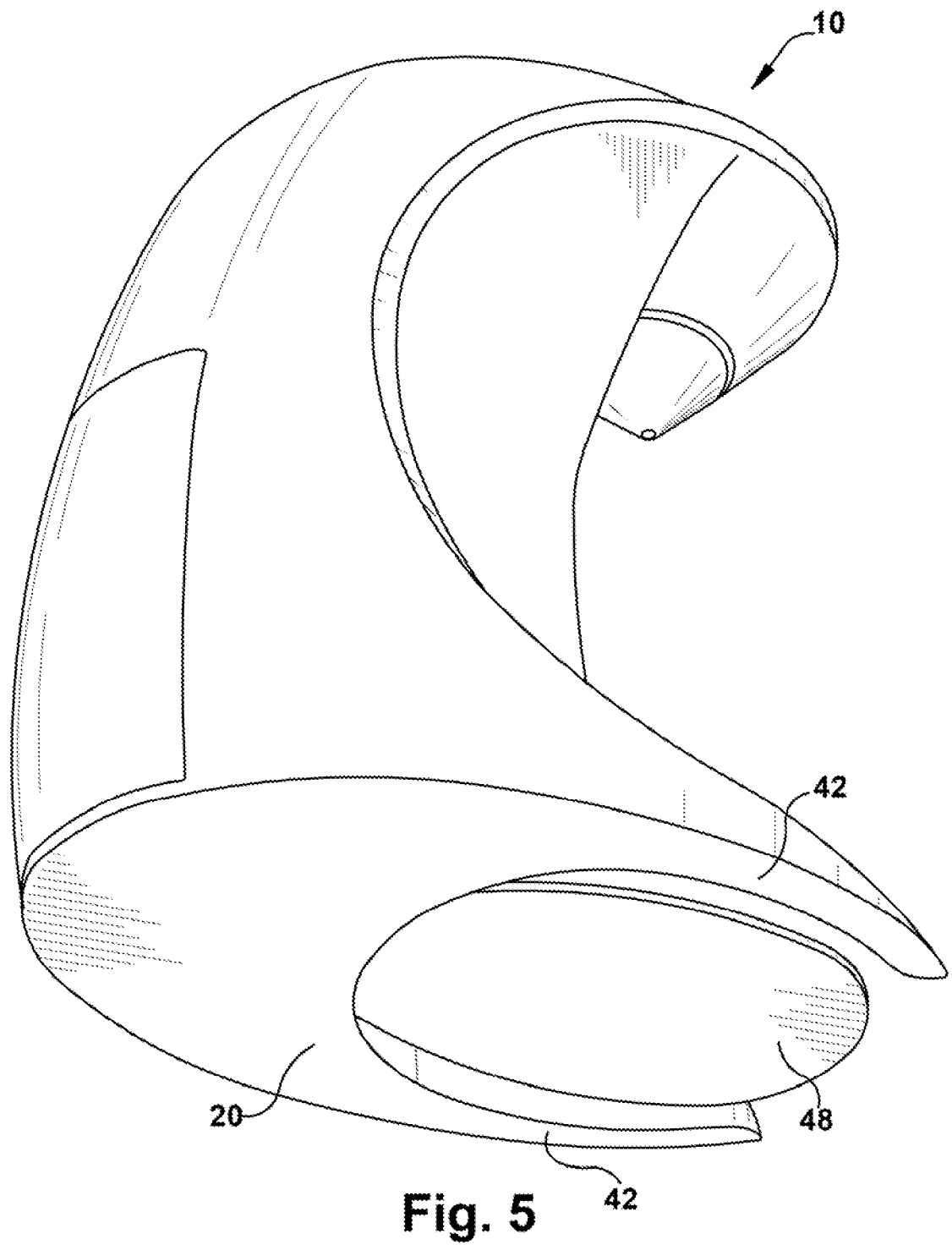
FIG. 5 is a bottom, rear perspective view of the device of FIG. 2.
Figure 6:
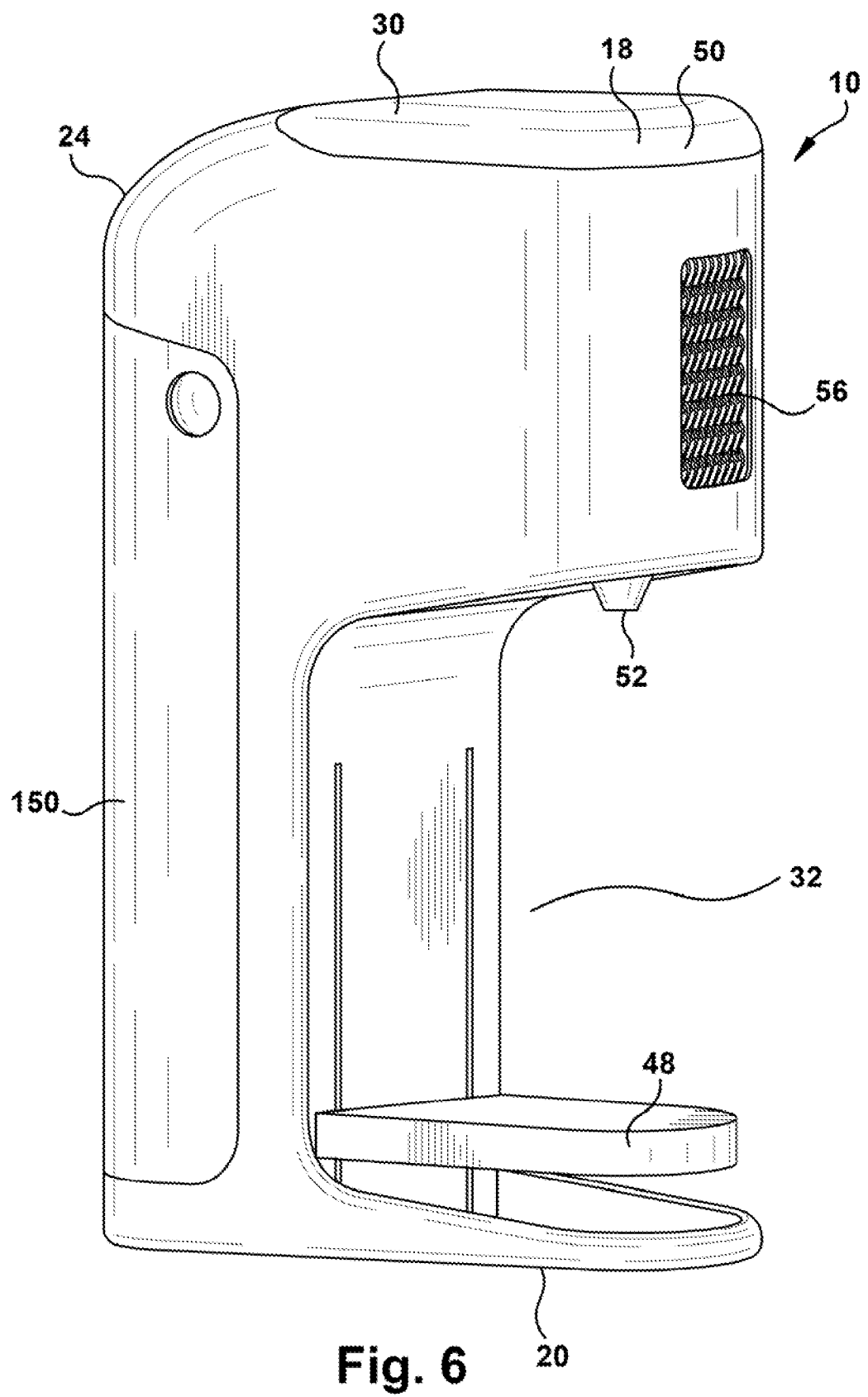
FIG. 6 is a perspective view of an alternative embodiment of the wine dispensing device of the invention, showing an adjustable height tray.

FIG. 6 depicts an alternative embodiment of the wine dispensing device 10 that has a shape different from the devices 10 shown in FIGS. 1-5. In this embodiment, the device 10 again has a housing with a top end, a bottom end, a front and a rear, and a left and a right side. A recess for receiving wine glasses and for dispensing liquid is provided at the front of device 10, below the head of device 10 which is positioned at the top end. The head of the device 10 is substantially rectangular in shape and is positioned at the top end and a discharge opening 52 is provided at the lower end of the head for dispensing a liquid. The opening is provided by a discharge nozzle positioned on the lower surface of the head. The discharge nozzle faces downwardly.

The device 10 includes a discharge bin on the rear side thereof. A cooling mechanism 54 is shown positioned on the front of the device 10 on the head. The cooling mechanism is positioned behind a window 56 that permits the user to view the wine as it flows over the cooling mechanism. As discussed in greater detail below, the cooling mechanism may have protrusions 58, such as fins, fingers, or ribs, that the wine flows over while being cooled by a cooling mechanism. The protrusions help to cause turbulence in the wine, which results in aeration. In addition to aiding in cooling (or warming) the wine, the protrusions also make for interesting viewing by the user.

The device 10 shown in FIG. 5 also includes an adjustable base member that is movable upwardly and downwardly. The base member may be raised for shorter glasses and lowered for taller glasses. Any known type of mechanism can be used for raising and lowering the adjustable base member. The base member shown includes a base plate, which is flat for positioning a glass on the plate. The base plate can include a drip tray, if desired. The base plate can be removable and replaceable at different heights using legs (not shown) that insert into recesses in the walls that surround the wine glass opening, or by sliding the base plate into recesses provided within the recess. The base plate can be snapped in at different heights. The base plate may rest on rails that permit it to be raised and lowered by pushing the base member up and down. The base plate locks into position at any location where it is pushed to.

Figure 7:
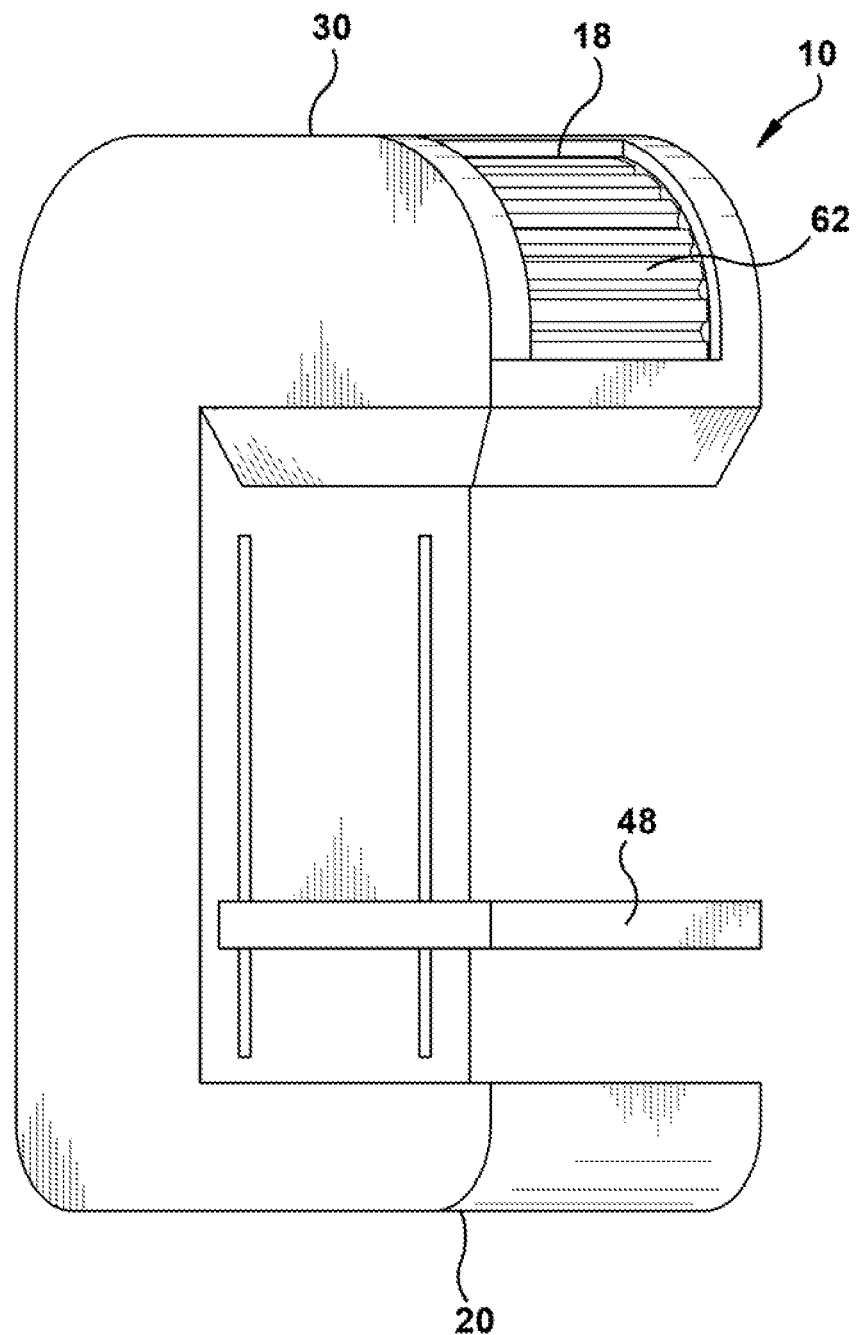
FIG. 7 is a perspective view of an alternative wine dispensing device having a rolling door, with the adjustable height tray positioned a mid-level height.

FIG. 7 depicts an alternative embodiment of the wine dispensing device 10 that is similar to the device 10 shown in FIG. 5, but that includes a roll-top door 62 for inserting the wine pouch 12 into the pouch receiving receptacle 60 in the head portion of the device 10. The device 10 also has an adjustable base that rides in two slots positioned in the rear of the front recess. This adjustable base permits the user to use differently sized glasses for dispensing wine, as discussed above. The roll top door may be manually operated or automatically operated with the use of a motor.

Figure 8:
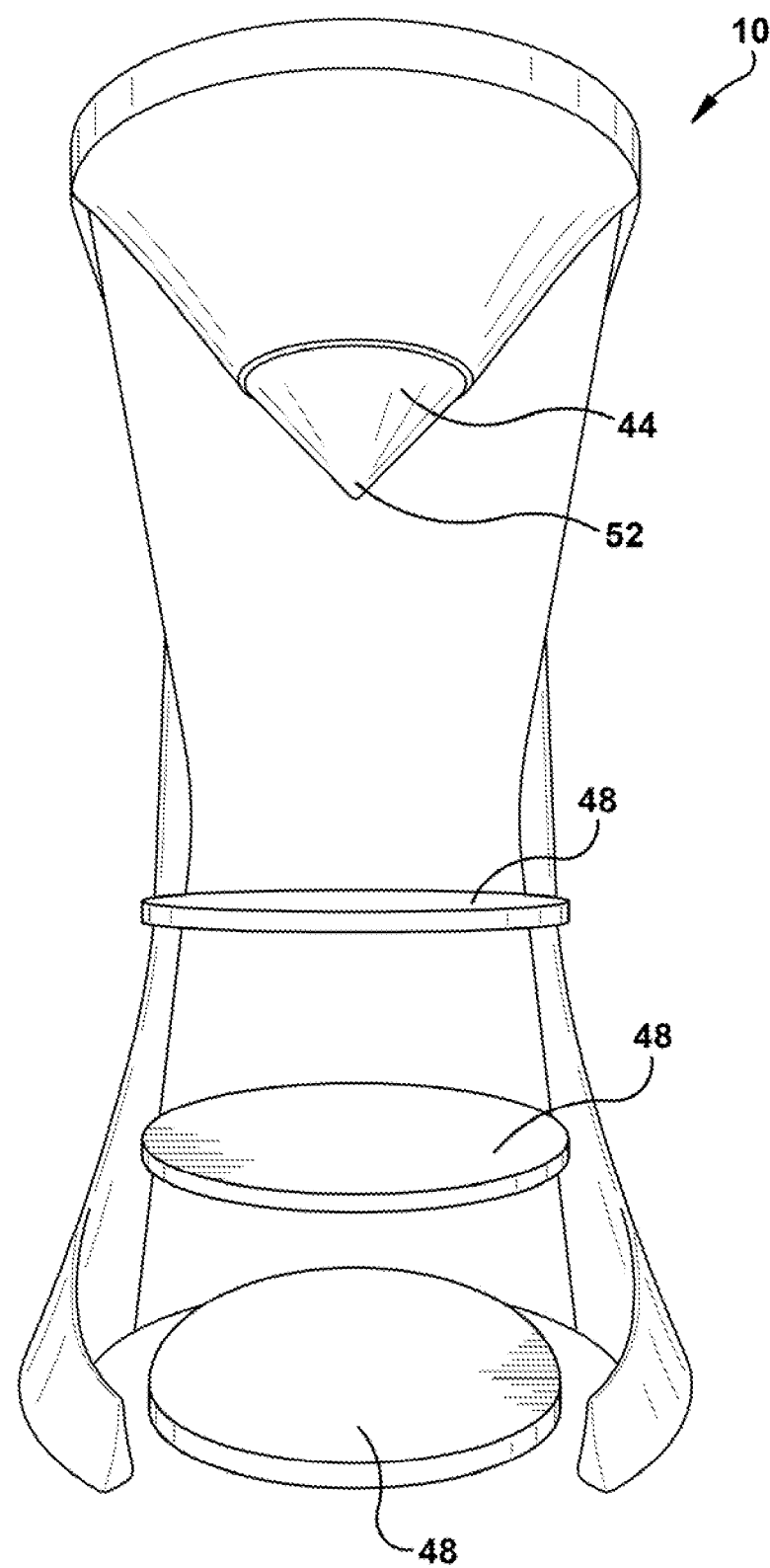
FIG. 8 depicts the device of FIG. 2 with an adjustable tray height, showing the different heights as they relate to differently sized wine glasses.

FIG. 8 depicts the wine dispensing device 10 showing different heights for the base member depending upon the type of glass used. The lowest height is used for a taller 10" glass, such as that used for a Bordeaux wine. This height is shown as being 10.9" to permit the glass to easily be inserted into and removed from the recess. A middle height for the base member is designed for a standard 7" glass and provides a 7.9" height to permit the glass to be easily inserted into and removed from the recess. An upper height for the base member is designed for a stemless glass, such as a 4" tall stemless wine glass. The recess provided at this upper height is 4.9" tall, again providing room for a glass to be inserted and removed from the recess. As discussed above, less splashing of wine will occur when the glass is positioned directly below the dispensing head. This provides for a more consistent wine tasting experience.

Figure 10:
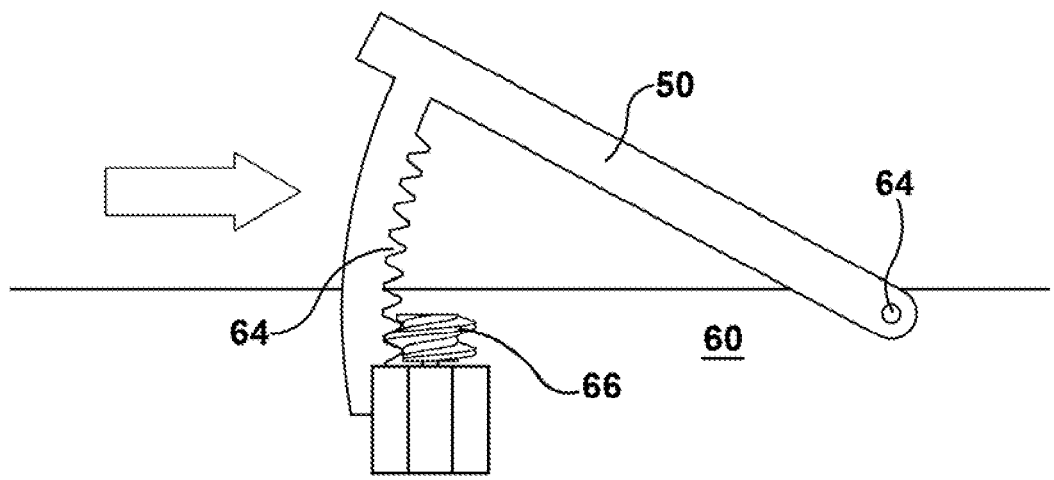
FIG. 10 depicts a door design for use with the wine dispensing device, with the door design using a worm gear.

FIG. 10 depicts a possible loading mechanism for loading a pouch 12 into the head of the wine dispensing device 10. In this embodiment, a door is provided on or near the top end of the wine dispensing device 10. The door is rotatable about a rearward pivot point 64 and may be driven by a worm gear 66 that mates with a rack 68 that is positioned on the door. The rack is positioned on an outer edge of the door and would be unnoticeable to the user. A motor would push the door up and down as gears push the teeth of the rack. This type of device can be used to automate the opening of the pouch door by pressing a button or otherwise signaling to the worm gear that it should start to turn to open the door. The pouch 12 can then be inserted into the opening that is created in the housing. The pouch door can form part of the upper surface of the wine dispensing device 10 and, when closed, can form a substantially smooth outer surface along with the remainder of the upper surface of the device 10. The door may include a sensor (not shown) that senses when a pouch 12 has been inserted and may close upon sensing a pouch 12.

Alternatively, a user may push a button to close the door, or press the door closed manually once the pouch 12 is properly installed.

Figure 11:
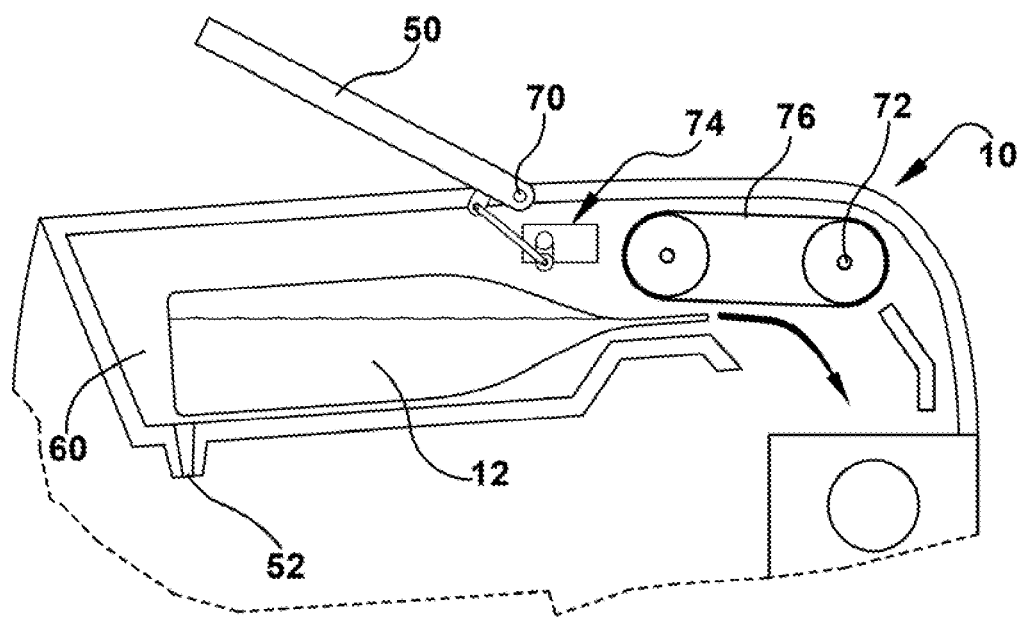
FIG. 11 depicts an alternative door design for use with the wine dispensing device.

FIG. 11 depicts a different pouch door that is coupled via a hinge 70 to a top end of the housing of the wine dispensing device 10. In this embodiment, the door is coupled to a drive member 72 and the drive member 72 is coupled to a servo motor 74. As the servo rotates, the door opens or closes. The door opening assembly of this embodiment is advantageous because it can be positioned on an outer edge of the interior of the head of the wine dispensing device 10 and does not interfere with other mechanisms inside the head portion. The servo can be operated by pressing a button or other means, including remote means. This embodiment provides a tray 60 into which the pouch 12 seats. The tray includes a discharge opening and the pouch 12 is opened while it is seated in the tray. The pouch 12 may be opened by any known opening technique, such as by slicing, cutting, piercing, squeezing, or the like. Wine then exits the tray into a cooling device, not shown. Once the wine is dispensed, a conveyor type device 76 that utilizes two rollers moves the pouch 12 rearwardly inside the housing, where it is dropped into a discharge bin.

Figure 12:
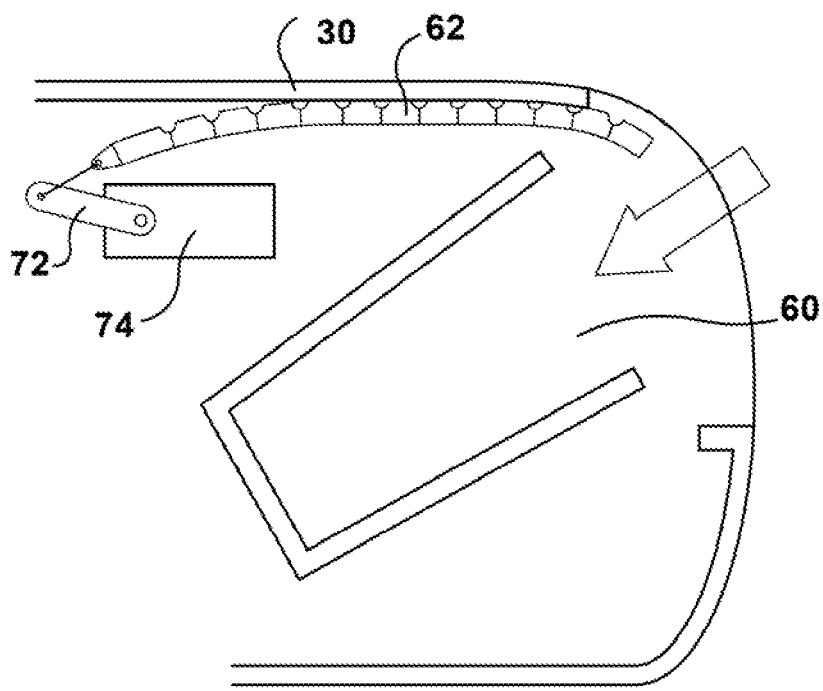
FIG. 12 depicts yet another alternative door design with a roll-top door, showing the door in an open position.
Figure 13:
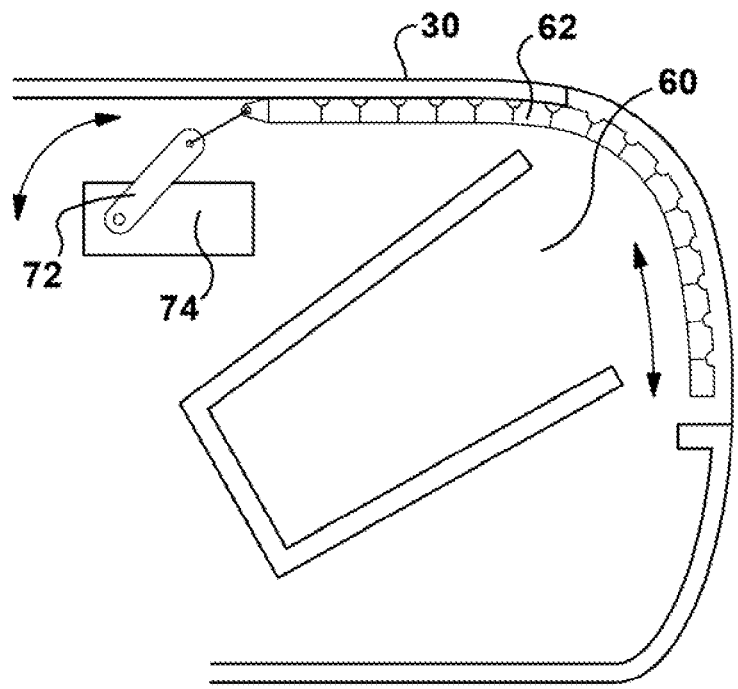
FIG. 13 depicts the door design of FIG. 12, with the door in a closed position.

FIGS. 12 and 13 depict an alternative door mechanism in the form of a roll-top door. The door is shown positioned on a front surface of the head. This type of door may also be utilized on a top, side or rear surface of the wine dispensing device 10. The roll top door could also be used for the discharge bin, if desired. In this embodiment, the user can push the roll-top portion upwardly so that it moves or translates into the interior of the head portion of the device 10. As shown the roll-top portion remains along the top of the interior of the head portion. Guides may be used for holding the roll-top in position. As the roll top travels rearwardly, it may engage a switch that flips when the roll-top engages the switch. This switch may be used for governing other operations of the device 10. Alternatively, the roll-top portion can be remotely opened with a motor, such as a servo, that can open and close the door with the press of a button or other instructions.

The roll-top remains on the outer edge of the interior of the head portion so that it doesn't interfere with other parts within the interior of the head portion. Once the roll-top is pushed upwardly, a pouch 12 can be inserted into the opening that is created. A receptacle for receiving the pouch 12 may be positioned in the opening, as shown in the figures. Other types of receptacles may be utilized, if desired. The pouch 12 can be cut using a cutting mechanism 78 or other opening mechanism, permitted to drain, and then disposed of by either manually removing the pouch 12 through the roll-top opening, or by an automated process for discarding the pouch 12 into a discard bin positioned near the rear of the device 10. For example, the pouch retaining receptacle shown may pivot downwardly to drop the pouch 12 into a discharge bin.

Figure 14:
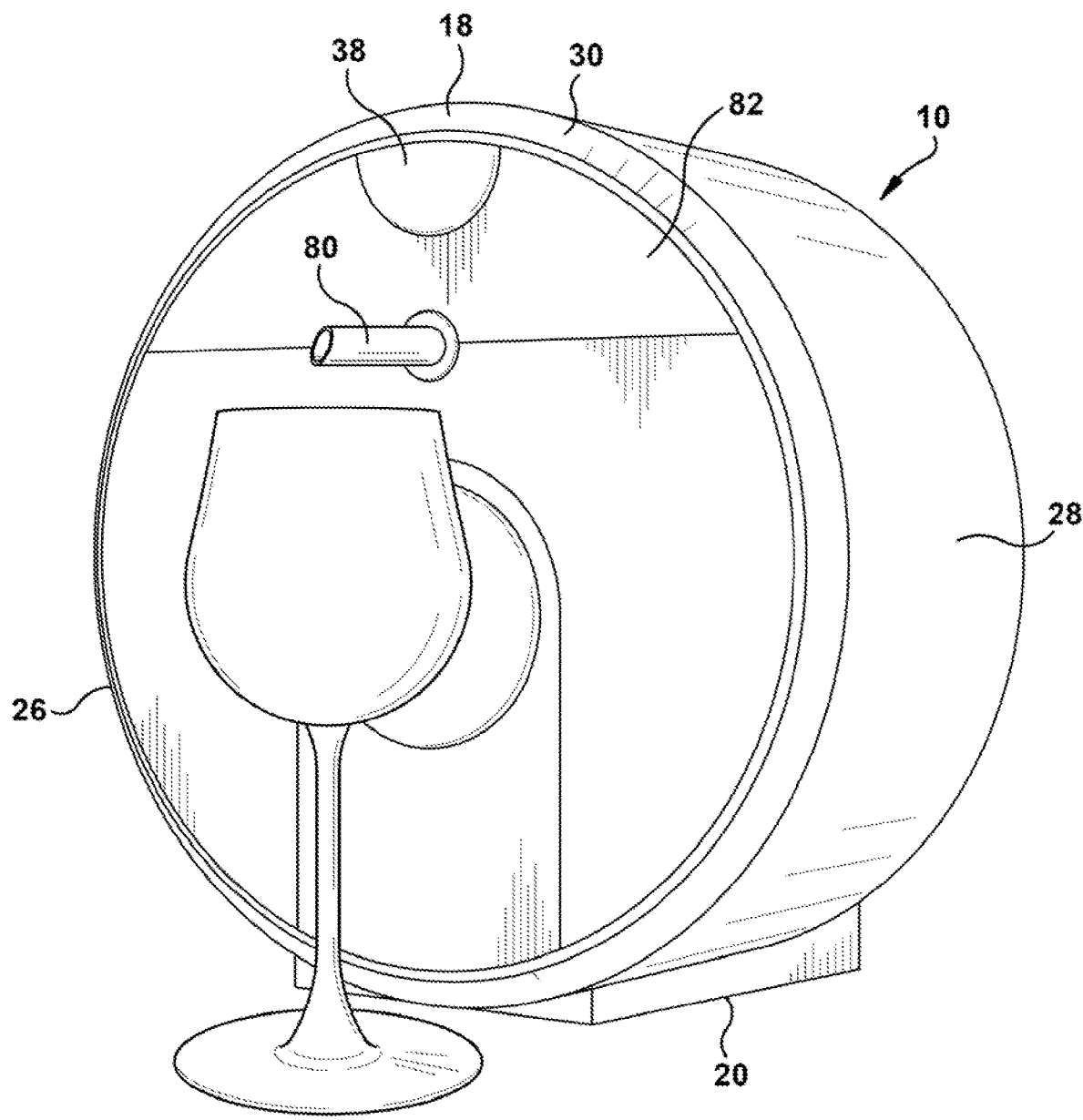
FIG. 14 is a perspective view of an alternative embodiment of the wine dispensing device according to the invention.

FIG. 14 depicts an alternative embodiment of the wine dispensing device 10, where the wine dispensing device 10 has a circular housing and a spout 80 that extends outwardly from a front side of the housing to dispense wine into a glass. This device 10 somewhat resembles a keg with a spout. In this embodiment, there is no central recess in the front side of the housing. Instead the wine glass seats are adjacent, but not inside the housing. This device 10 includes one touch operation via a button positioned at the top of the front side. This device 10 can provide aeration that is visible in the top part 82 of the housing, which can be transparent to show the wine inside the housing. A heat sink or other cooling devices may also be positioned in the upper part of the housing. The device 10 may also include a wine level indicator and an aerating component (not shown). A button is shown positioned at the top front of the device 10. The button shown is semicircular in shape and can be lighted, if desired. Other types of interfaces could be used, as discussed above. The button can have a different shape and multiple buttons may be utilized, if desired.

Figure 15:
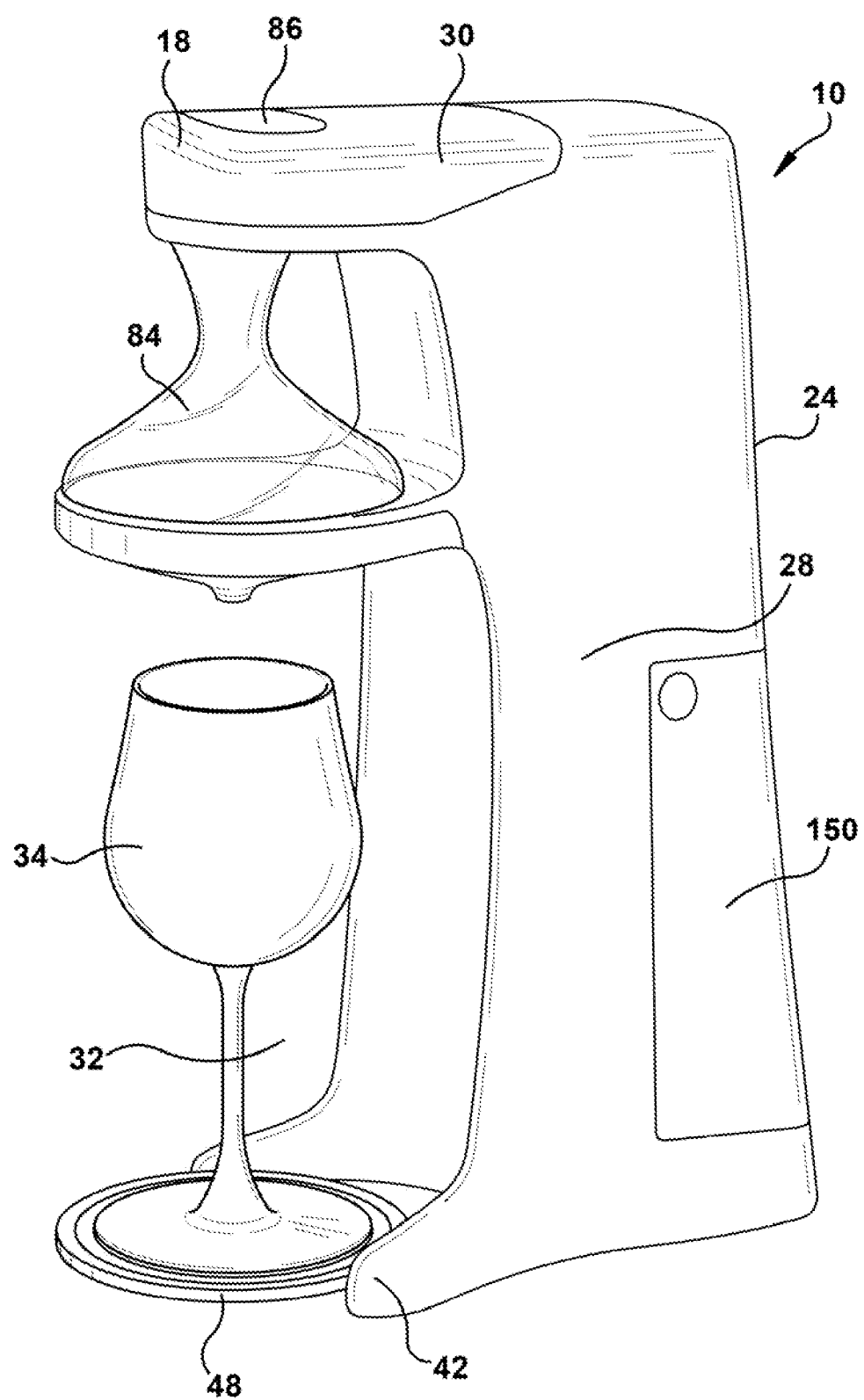
FIG. 15 is a perspective view of yet another alternative embodiment of the wine dispensing device according to the invention.

FIG. 15 depicts another alternative embodiment of a wine dispensing device 10 according to the invention. In this embodiment, the device 10 includes a built-in decanter 84 that the wine can flow into before being dispensed through the discharge nozzle of the device 10 into an underlying glass. This device 10 has a capacitive touch area 86 on the upper surface of the housing for operating the device 10. A discard bin is positioned at the rear of the housing and the housing includes a hidden internal reservoir 40 for storing water for cleaning the decanter and the interior of the device 10. This embodiment also includes an adjustable base member, which can be made of aluminum or other materials, if desired. A door for inserting a pouch 12 is shown on top of the device 10 and the door can pivot upwardly to reveal a space for inserting a pouch 12 into the device 10. The visible decanter feature could be incorporated into other designs disclosed herein.

Figure 16:
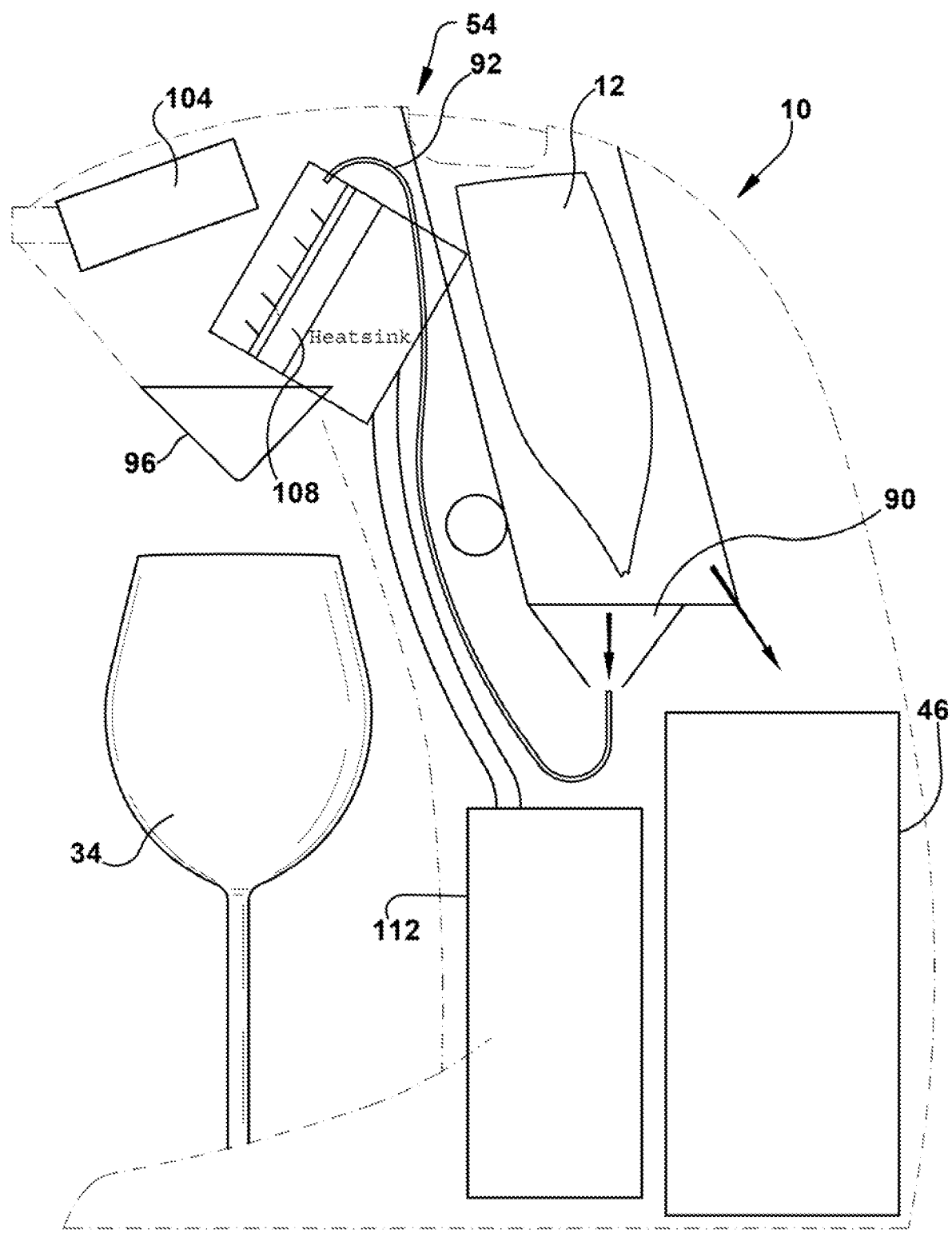
FIG. 16 is a side schematic view of the device shown in FIGS. 2-5 depicting the internal workings of the device.
Figure 17:
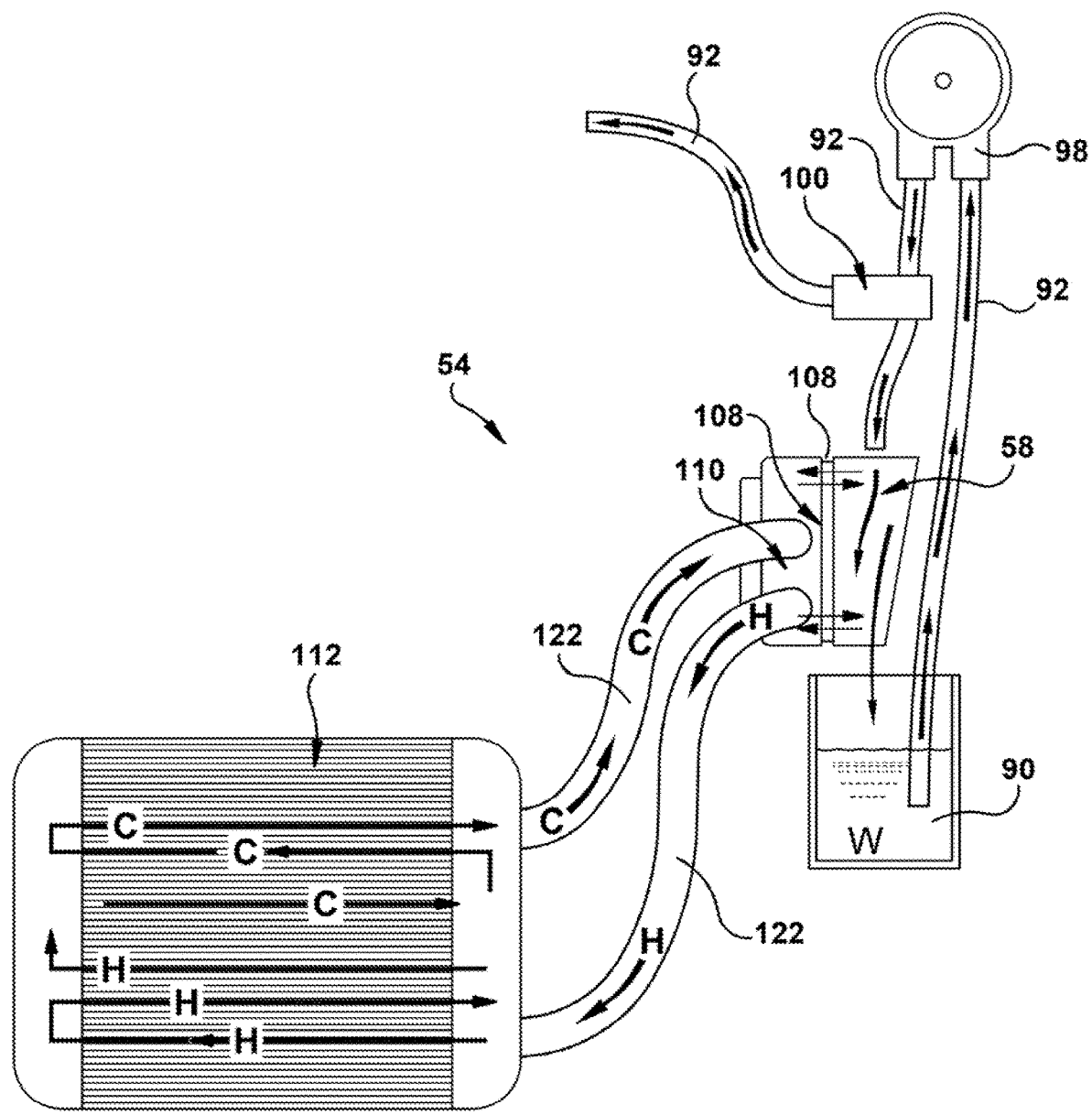
FIG. 17 is a schematic of the cooling system of the device.

FIG. 16 is a schematic of the internal parts of the wine dispensing device 10. The schematic is not to scale, but a general location for various parts is shown. The actual location for the various parts may be different from that shown. FIG. 17 depicts a schematic of parts of the cooling system of the device 10. FIGS. 16 and 17 can be used together to get a better understanding of the internal workings of the device 10.

Referring to FIG. 16, the machine includes a pouch receptacle, a bin for discarded pouches 12, a funnel 90 positioned below the pouch receptacle for capturing wine that is released from the pouch 12, a tube 92 that extends from the bottom of the funnel to the cooling system, a cooling system 94, and a discharge receptacle 96 and nozzle. The pouch receptacle in this embodiment communicates with an opening in the upper surface of the device 10, similar to that shown in FIG. 2-5. The pouch receptacle is shown having an opening that is closed by a door. Any type of door can be used, including those disclosed herein as well as other types of doors. Alternatively, the pouch opening could always be open. The pouch opening is sized to accept a pouch 12 therein and to permit a user to insert a pouch 12 into the pouch receptacle.

A pouch 12 is positioned in the pouch receptacle in a top down position, e.g., where the thin part of the pouch 12 (or the part that appears to have a spout) is inserted first into the receptacle. When inserted into the receptacle, the pouch 12 is fully inserted into the receptacle so that no part of the pouch 12 extends outside of the device 10. Alternatively, part of the pouch 12 could extend outside the receptacle, if desired. The pouch receptacle is associated with an opening mechanism that is used for opening the pouch 12 so that liquid may be dispensed therefrom. The opening mechanism may be a cutting mechanism that is used to cut the pouch 12 open so that liquid vacates the pouch 12. Other types of opening mechanisms, as discussed above, may also be used either singly or in combination. If a different type of container is used, such as those that are not entirely soft pouches, other opening mechanisms, as disclosed above, could be used. The term pouch 12 is used herein to refer to a soft pouch 12, but also can refer to a non-soft pouch, e.g., one having non-flexible parts, or a molded receptacle, such as those discussed above. The term pouch is meant as a universal term herein for describing a receptacle for holding a liquid.

As liquid leaves the pouch 12, it flows into a receptacle 90 that is positioned below the pouch receptacle. The receptacle shown in this embodiment is funnel shaped. The funnel 90 may be larger or smaller than that shown, and other shapes may be used, if desired. The liquid in the pouch 12 flows into the receptacle 90 via gravity. A tube 92 transfers liquid from the pouch 12 to the cooling system 94. A tube 92 may be coupled to the bottom of the funnel and a pump 98. The liquid in the receptacle may be pumped upwardly through the tube to the cooling system. Then the liquid is circulated through the cooling system, as shown in FIG. 17. Wine is retained within a cooling receptacle until it is cooled to a desired temperature. After the liquid is cooled, a valve 100 is utilized to direct fluid to the discharge receptacle/nozzle. The discharge receptacle 96 may have aerating features, such as an umbrella aerator 102 or a different type of aerator. The discharge nozzle may include special patterns, such as swirl patterns or other patterns that aid in aeration. The discharge nozzle can have one or multiple holes for dispensing, which may also aid in aeration.

As shown in FIG. 16, the housing has two legs 42 that extend forwardly from the sides of the housing. In addition, the housing includes a central recess into which a wine glass may be inserted so that the glass is positioned under the discharge nozzle.

Electronics 104 are shown as being stored inside a front end of the head portion and are coupled to an activation button as well as other electrical parts of the device 10. While not shown, other electronics may be positioned at other locations within the housing. The device 10 also includes an electrical connector for coupling with a power cord and plug (not shown).

As shown, the opening for inserting a pouch 12 into the device 10 is positioned near the rear side on the upper end of the device 10. The pouch opening in the device 10 may be manually operated, requiring a user to open it, or may be opened electronically by the system based upon an activation signal by a user. The pouch opening could also be a permanent opening in a surface of the device 10.

The pouch receiving receptacle is sized for holding the pouch 12 in position in the opening. The pouch 12 must be held in place to be property cut/sliced by a cutting/slicing mechanism. A cutting mechanism is used to cut open the pouch 12 so that wine drains from the pouch 12 into the underlying receptacle or funnel. The cutting mechanism may also slice and/or puncture the pouch 12 at more than one location to aid in wine escaping from the pouch 12. The cutting mechanism can cut the pouch 12 with a single swing of a blade, or with motorized action of a cutting blade that moves inwardly and outwardly repeatedly, as will be discussed in further detail below, to help to further agitate the wine in the pouch 12 so that the pouch 12 empties more quickly. A knife that moves in and out repeatedly can be operated by a motor, such as a servo. The pouch 12 may be opened by other means, as known by those of skill in the art. Techniques for slicing open a pouch 12 is shown in U.S. Pat. No. 9,695,030 to Walker and U.S. Pat. No. 9,932,218 to Melville et al., the disclosures of which are incorporated herein by reference in their entirety.

As the cutting blade enters the pouch 12, it inherently creates some decanting because it results in air being introduced to the contents of the pouch 12. The funnel that is positioned below the pouch 12 that captures the wine before it is pumped to the cooling system also serves a decanting function because the wine will remain in the funnel for at least a short period of time before it is pumped upwardly.

To save head space within the device 10, the pouch 12 is shown as being emptied into a lower part of the unit and then pumped up to the cooling system. A peristaltic pump 98 may be used that pushes the wine without touching it. The only downside to the use of a peristaltic pump is lower flow rates, but due to the length of time it takes to cool the wine with the Peltier cooler, the low flow rates are not considered to be an issue. The pump may pump wine from the funnel through a tube upwardly to the cooling section of the device 10, which is positioned near the top of the head portion of the housing. The tubing may be any type of food-grade tubing.

Cooling System:

The cooling system of the wine dispensing machine chills wine to a desired temperature. The device 10 may include a switch or knob (not shown) positioned on the housing that sets the desired temperature. Recommended serving temperature ranges for wine range from 48 degrees F. to 68 degrees F. (9 degrees C. to 20 degrees C.), as follows:

| | |
|---|---|
| Tart, bright white wines | 48-52 degrees F. (9-11 degrees C.) |
| Sparkling wine | 50-55 degrees (10-13 degrees C.) |
| Rich white wine | 58-62 degrees (14-17 degrees C.) |
| Light red wines | 60-65 degrees (15-18 degrees C.) |
| Heavy red wines | 63-68 degrees (17-20 degrees C.) |

The temperature setting may be completely variable, or could be set to two or three different preferred temperatures, such as 50 degrees F. (10 degrees C.), 60 degrees F. (15 degrees C.) and 65 degrees F. (18 degrees C.) to cover a range of types of wine, or 50 degrees F. (10 degrees C.) and 62 degrees F. (17 degrees C.), to cover most of the above ranges.

The cooling system, shown in FIG. 17, uses a cooling device, such as a Peltier cooler 108, a heat sink 110, a radiator 112, a pump 106, a fan 114, and tubing 92. A Peltier cooler is a thermoelectric cooling device that uses the Peltier effect to create a heat flux between the junction of two different types of materials. A Peltier cooler is a thermoelectric solid-state heat pump that transfers heat from one side of the device to the other side, with the consumption of electrical energy.

Figure 26:
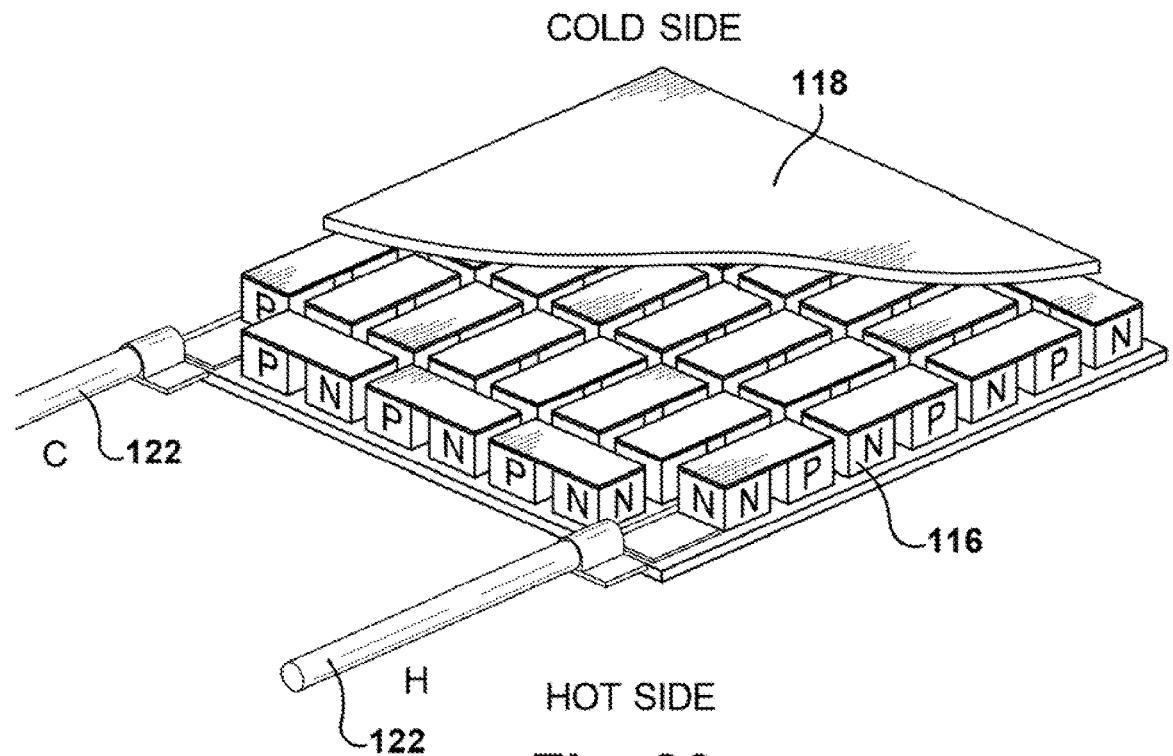
FIG. 26 depicts a perspective schematic view of a wine sink utilizing a Peltier cooling device.

Thermoelectric coolers/Peltier coolers have two sides. When a DC electric current flows through the device, it brings heat from one side to the other, such that one side gets cooler while the other side gets hotter. The "hot" side 116 is attached to a heat sink so that it remains at or near ambient temperature. The cool side 118 is below room temperature. Multiple coolers can be cascaded together if greater cooling is necessary. An image of a Peltier cooler is shown in FIG. 26.

Peltier coolers are also commonly referred to as Peltier device, Peltier heat pump, solid state refrigerator, or thermoelectric cooler (TEC). Peltier coolers can be used for heating or cooling, although in practice their main application is for cooling. Primary advantages of Peltier coolers are that they lack moving parts or circulating liquid, have a very long life, are invulnerable to leaks, have a small size, and have a flexible shape.

For the present application, a Peltier cooler is a viable option for cooling the wine without requiring a user to add ice and water. Electricity is input to the Peltier cooler and energy is transferred from one side to the other creating a hot and a cold side. The cold side is used to chill the wine and the hot side is cooled by a heat sink, fan and radiator so that the cold side can continue to chill the wine.

As discussed above, and as shown in FIG. 17, a wine reservoir, which may be the same reservoir that is shown positioned below the pouch receptacle, is coupled to the Peltier cooler via tubing and a peristaltic pump. The wine travels through the Peltier cooler, returns to the wine reservoir, and then is pumped back to the Peltier cooler via the peristaltic pump until such time that the wine reaches the desired temperature, or the device has timed out. Once the desired temperature is reached or the device has timed out, the solenoid valve will open and direct the wine to the discharge nozzle of the device to be served. A cooling block is coupled to the Peltier cooler and includes a heat sink and a pump. The heat sink is positioned directly adjacent to the hot side of the Peltier cooler and is coupled to a radiator by tubing and fluid in the heat sink is circulated through the heat sink to the radiator and back. The cooling block is used to carry heat away from the hot side of the Peltier cooler.

Figure 24:
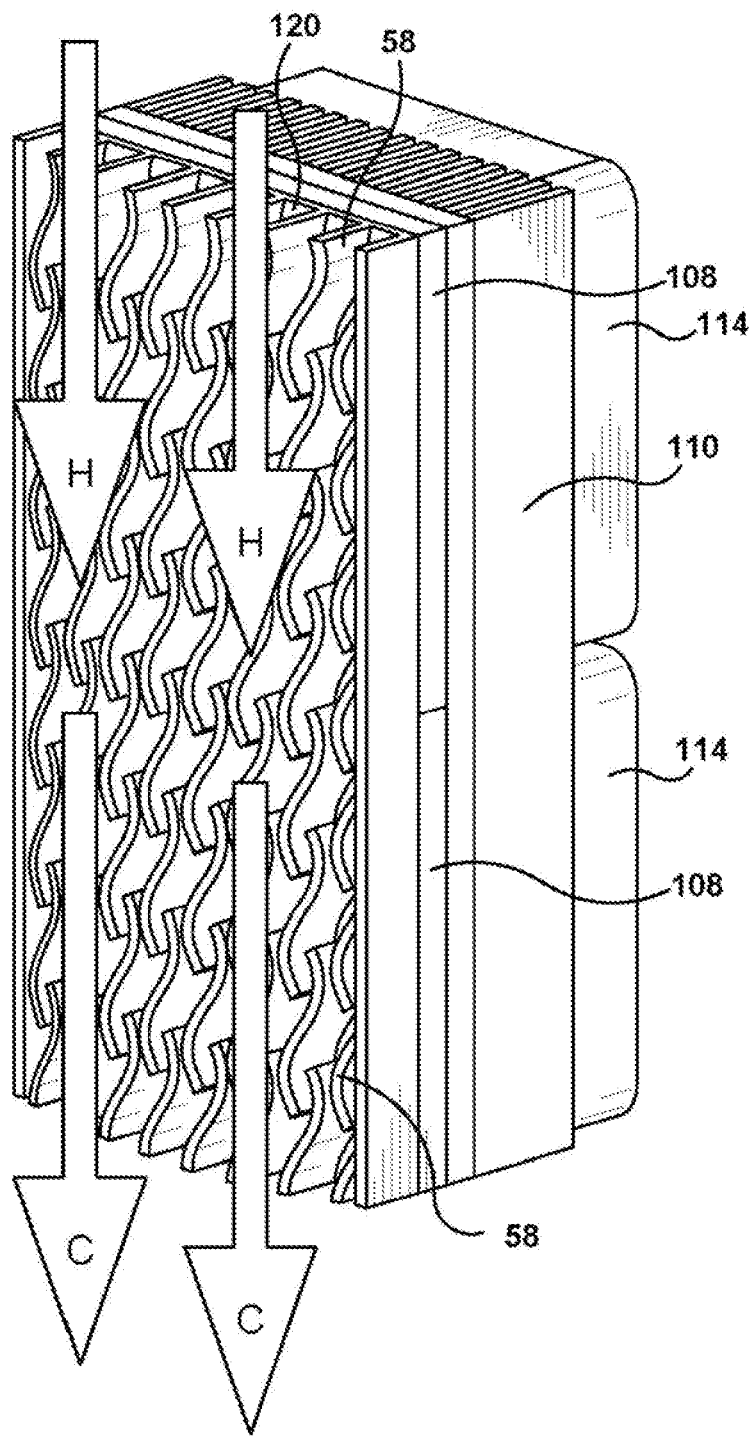
FIG. 24 depicts means for cooling and/or warming wine in the wine dispensing machine utilizing a Peltier cooling device.

A cooling block and Peltier cooler are shown in FIG. 24. The cooling device shown includes two Peltier coolers that have a dimension of about 40 mm×40 mm each. The cooling device has wavy-shaped fins or fingers that extend outwardly from the Peltier coolers. The fingers of the heat sink allow for proper heat transfer (cooling) and may also aerate naturally. The downside is that it may be necessary to rinse or clean the fingers. The warm side of the Peltier coolers are coupled to a heat sink, which is coupled to two fans. The Peltier cooler creates a chamber through which the wine can flow, which is a large flat area, like a pan that is covered by a lid. The chamber that the wine flows through can be enclosed such that a cap is positioned over the pan surface of the Peltier cooler. While fingers are shown extending from the cooling surface of the Peltier cooler, a flat surface could be used, or one where patterns are engraved into the flat surface 120 could be used to increase the amount of surface area for contacting the wine.

The cooling system works in a similar manner to an automotive cooling system by pumping a liquid 122, such as water, water mixed with a coolant, or a coolant, through passages in the heat sink to the radiator and back. For example, mineral oil/glycerin could be used. The mineral oil helps to keep the internal parts lubricated, which is advantageous to the operation of the parts of the system.

Because of the close proximity between the heat sink and the hot side of the Peltier cooler, the heat sink picks up heat from the Peltier cooler. Liquids have a much higher coefficient of heat than air, so it's possible to remove more heat from the TEC/Peltier cooler if liquids are used for cooling in the heat sink. The heat sink has passages therethrough that permit the liquid to flow into one side of the heat sink, pick up heat from the Peltier cooler while at the same time cooling the hot side of the cooler, and flow out of another opening in the heat sink. The heated fluid then travels via tubing to a radiator. As the fluid is pumped through the radiator fins, the surface area for cooling the fluid is maximized, which cools the liquid quickly. The radiator has thin tubes and the hot liquid is cooled by an air stream entering the radiator. A fan can be coupled to the radiator to push air through the radiator. Once the fluid is cooled, it returns to the heat sink to absorb more heat. The pump is utilized to keep fluid pumping through the cooling system. One type of pump that can be utilized is a diaphragm pump. Use of a radiator with a Peltier cooler can permit for multiple glasses of wine to be chilled consecutively.

In a preferred embodiment, it is desired to lower the temperature of the wine by 20 degrees F. (6.7 degrees C.) in 1 minute. If the wine enters the system at 75 degrees F. (24 degrees C.), the wine will be 55 degrees F. (13 degrees C.) within 1 minute. Alternatively, in another preferred embodiment, it is desired to be able to lower the temperature of the wine by 20 degrees (6.7 degrees C.) in 2 minutes. In yet another embodiment, the cooling objectives are to chill 4-5 ounces of wine in 2-2½ minutes, with two output temperatures of 50 degrees F. (10 degrees C.) for white wine and 68 deg. F. (20 degrees C.) for red wine. Other size pouches may be utilized, including 3 or 4 oz. pouches, or pouches in between 3 or 4 oz. pouches, 4 or 5 oz. pouches, 5 or 6 oz. pouches, or pouches in between these sizes.

In one embodiment, the Peltier cooler has a flat upwardly facing surface 120 that forms a channel that the wine can travel over and through, such as that previously discussed in FIG. 24. The flat surface includes projections, such as fingers, fins or blades, that extend upwardly from the flat surface of the Peltier cooler. The flat surface of the Peltier cooler imparts cooling to the wine. In addition, the projections, because coupled to the flat surface of the Peltier cooler, also impart cooling to the wine. The projections on the Peltier cooler also cause turbulence in the wine flow, which helps to aerate the wine while the wine is being cooled. Thus, the wine is chilled and aerated at the same time.

The Peltier cooler may be angled at an angle between 0 and 90 degrees so that the wine flows across the Peltier cooler from one end to the other. Possible angles include 10, 20, 30, 40, 45, 50, 60, 70, and 80 degrees. When the Peltier cooler angle is lower, the wine takes longer to flow across the cooler and, as a result, is chilled more than a cooler angle that is greater. The Peltier cooler is shown as having a length that is greater than a width, with the liquid flowing across the cooler lengthwise. Alternatively, the liquid could flow across the cooler widthwise.

It is preferred that the cooling system cools the wine to a desired temperature. However, there may be instances when the system is not able to fully cool the wine. For example, if the wine is particularly hot when inserted into the device, it may not be possible to lower the temperature enough in the preferred time. In these cases, the system will cool the wine until a time limit is reached, at which point the wine will be released. There may be times when the wine is too cool when inserted into the system, such as being below 50 degrees F. (10 degrees C.) for white wine. In these instances, the system will hold the wine for a predetermined period before dispensing it through the dispensing nozzle.

Figure 25:
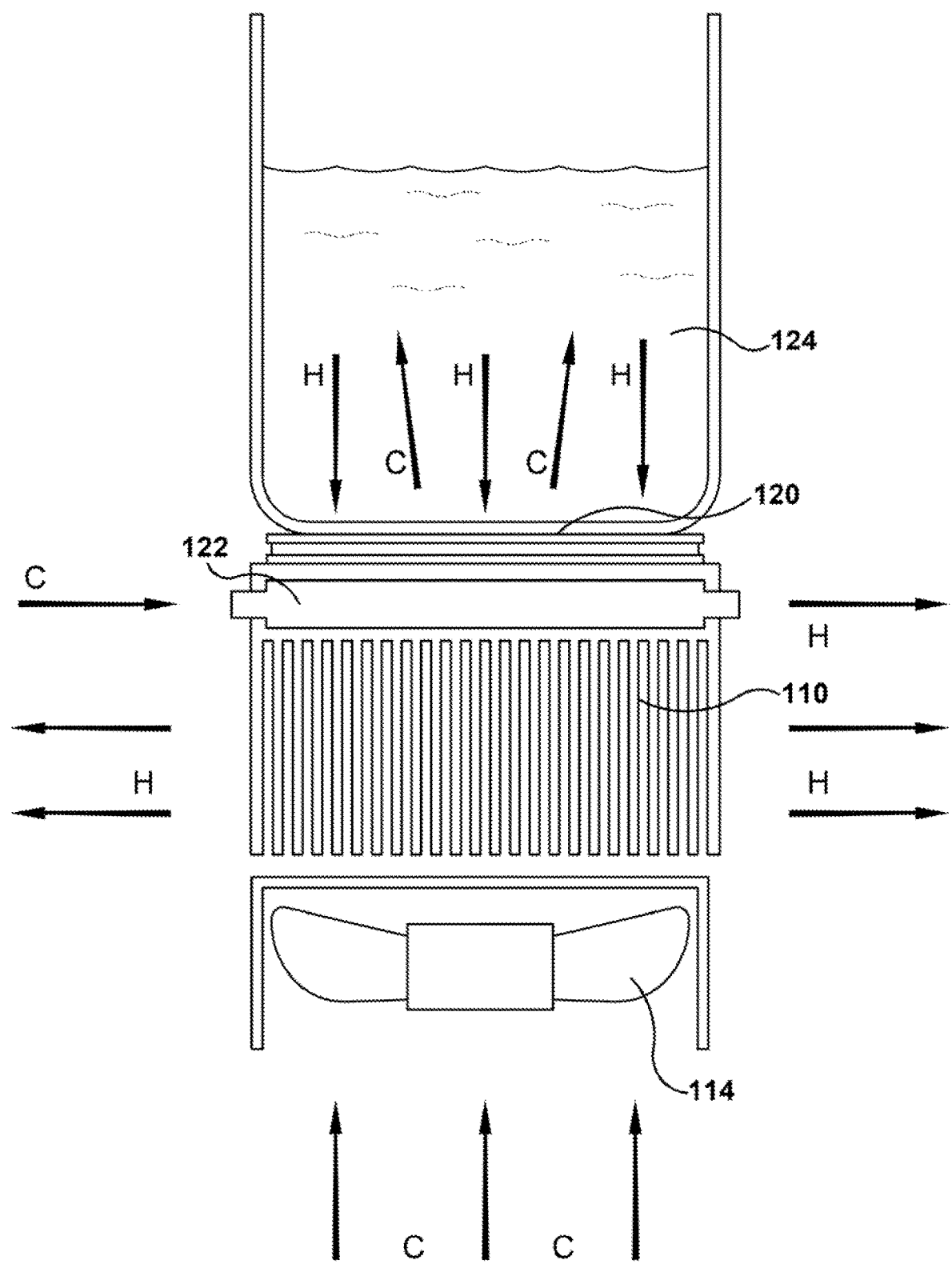
FIG. 25 depicts an alternative means for cooling and/or warming wine in the wine dispensing device utilizing a Peltier cooling device.

FIG. 25 depicts another configuration for the cooling system. In this embodiment, the wine falls into a wine reservoir 124 where it is cooled within the wine reservoir until it reaches a desired temperature, then it is pumped out of the wine reservoir to the discharge nozzle. This embodiment utilizes a Peltier cooler. The cold side of the Peltier cooler is positioned directly adjacent to the wine reservoir. A water block/heatsink is positioned directly adjacent to the hot side of the Peltier cooler. Water flows continuously through the heatsink via a pump. The heat sink includes a plurality of fins that extend away from the Peltier cooler. The fins help to aid in dissipating heat from the hot side of the Peltier cooler. A fan is coupled to the fins to continuously cool the fins with air. A temperature sensor 126 may be associated with the wine in the wine reservoir to measure the temperature of the wine to determine when it is ready to dispense.

Figure 27:
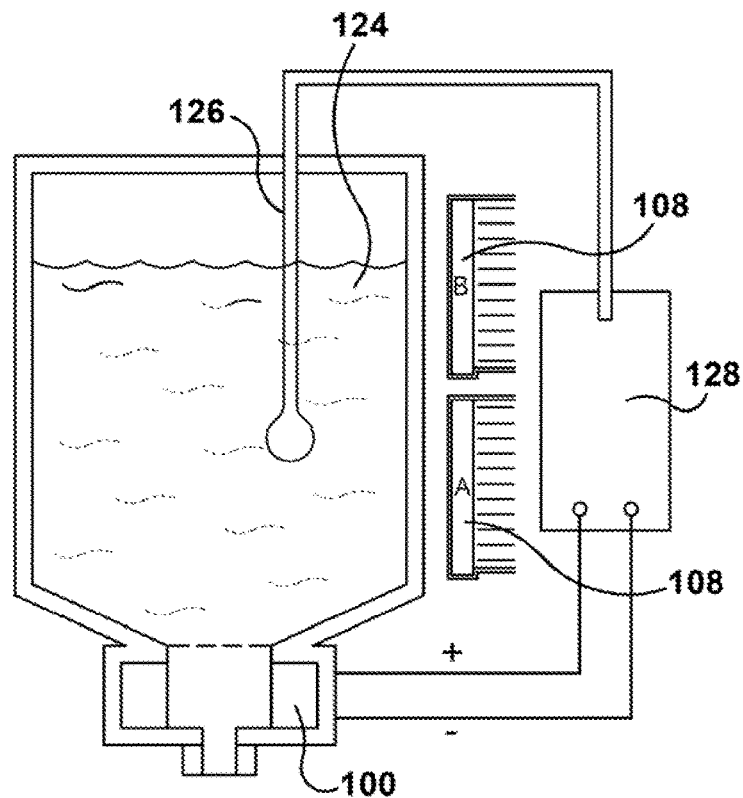
FIG. 27 depicts an alternative means for cooling and/or warming wine in the wine dispensing device utilizing a Peltier cooling device.

FIG. 27 depicts another configuration for the cooling system. In this embodiment, wine moves into a wine reservoir. The wine reservoir has a temperature sensor positioned therein for measuring the temperature of the wine in the reservoir. The reservoir is vertically oriented and includes a valve that is positioned at the bottom end of the reservoir. Two Peltier coolers are positioned directly adjacent to the wine reservoir and are used to cool the wine in the wine reservoir. The temperature sensor is coupled to a PCB 128 and provides a signal to the valve to open when the temperature reaches a desired level.

Alternatively, in this embodiment, the pouch 12 could be positioned directly into the reservoir and could be cooled by the Peltier cooler. Then when a desired temperature is obtained, the pouch 12 can be cut by a cutter and the wine can be permitted to flow through the open bottom end of the reservoir.

Figure 28:
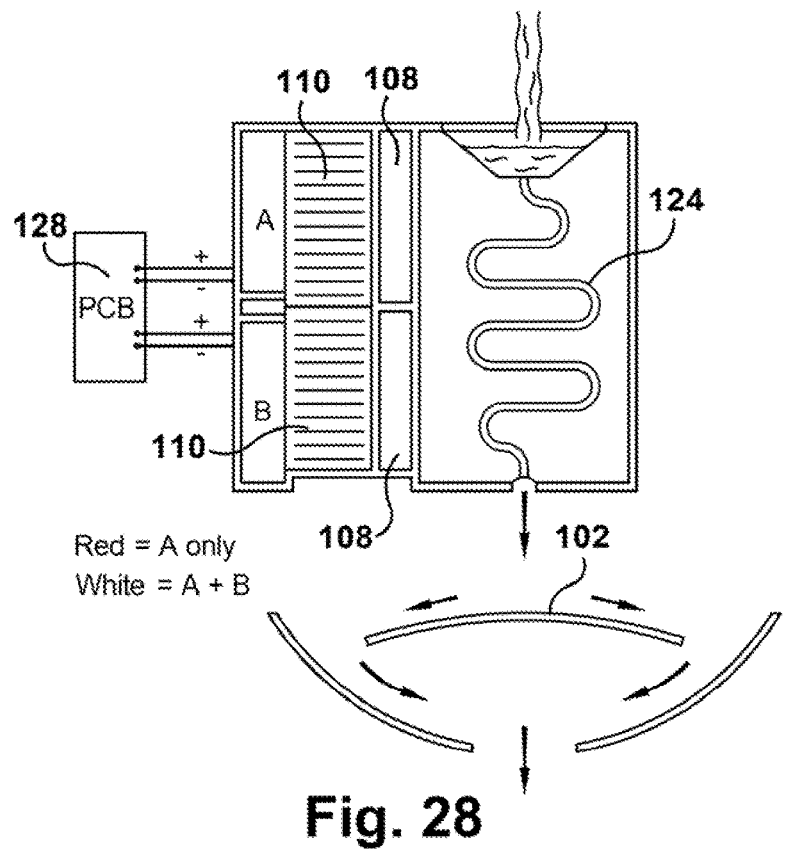
FIG. 28 depicts yet another alternative means for cooling and/or warming wine in the wine dispensing device utilizing a Peltier cooling device, along with an aeration device.

FIG. 28 depicts an alternative cooling system. In this embodiment, two Peltier coolers are positioned directly adjacent to a cooling block that has a receptacle for receiving wine and a circuitous pathway that extends through the cooling block. As wine travels through the pathway in the cooling block, it is cooled. A valve is not needed to retain the wine in the cooling block because the pathway of the block is designed to fully cool the wine before it exits the cooling block. This embodiment uses programming that determines if red or white wines are being dispensed. If red wine is being dispensed, cooler A is operational. If white wine is being dispensed, both coolers A and B are operational. The type of wine can be sensed by reading a barcode on the package. One type of bar code reading is disclosed in U.S. patent application Ser. No. 15/449,949 to Wu, the disclosure of which is incorporated herein by reference in its entirety. Other conventional barcode devices and reading techniques may also be used, as known by those of skill in the art. In this embodiment, after the wine exits the cooling block, the wine falls onto an umbrella aerator to aerate the wine, which is then permitted to exit the device 10 through a discharge nozzle.

Figure 29:
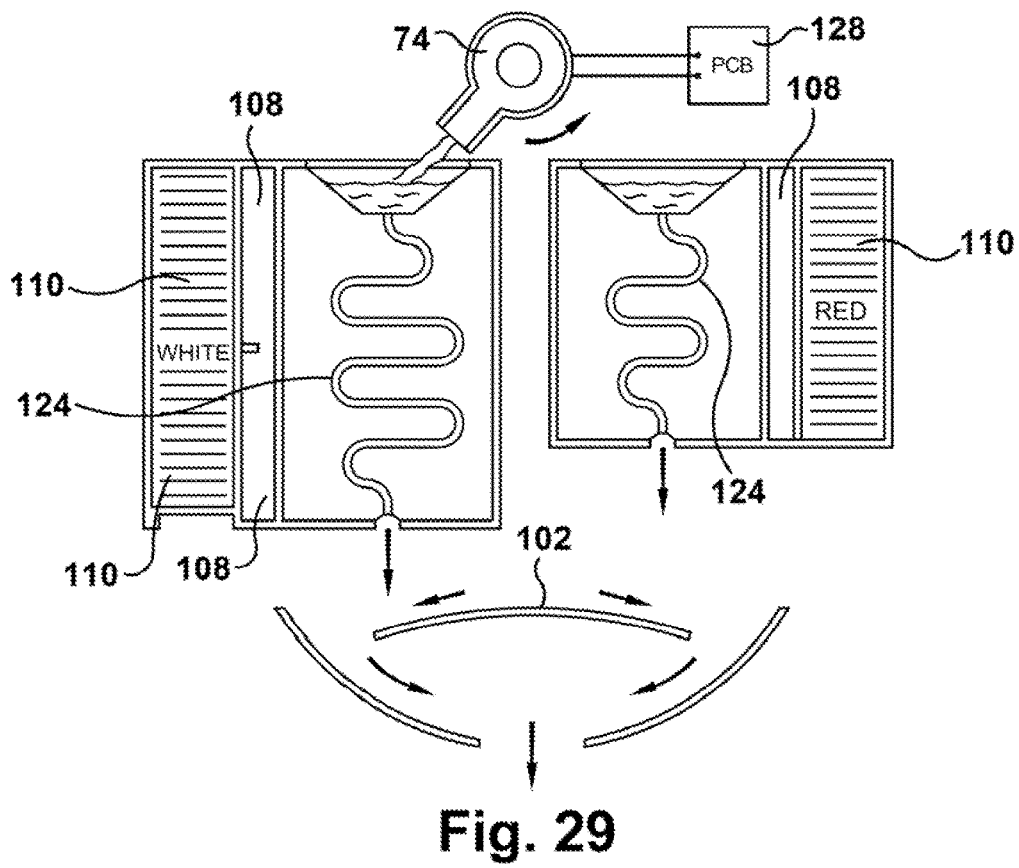
FIG. 29 depicts yet another alternative means for cooling and/or warming wine in the wine dispensing device utilizing a Peltier cooling device, along with an aeration device.

FIG. 29 depicts yet another alternative cooling system. This embodiment is similar to that shown in FIG. 28, except that different cooling blocks are used depending upon whether the wine is red or white. The red wine cooling block is shorter and has a shorter pathway for cooling. The white wine cooling block is longer and has a longer pathway for cooling. A solenoid valve is not used in this embodiment. The device 10 includes a servo that directs wine either to the red block or to the white block by rotating between the two blocks. A PCB determines the location of the servo that dispenses wine into one of the cooling blocks. The PCB may be coupled to a bar code reader (not shown) for determining which type of wine is being dispensed. Alternatively, a user may flip a switch or otherwise signal to the PCB what type of wine is being dispensed. After wine exits the cooling blocks, it falls into a discharge receptacle that includes an umbrella aerator, which aerates the wine before it exits through the discharge nozzle.

Figure 30:
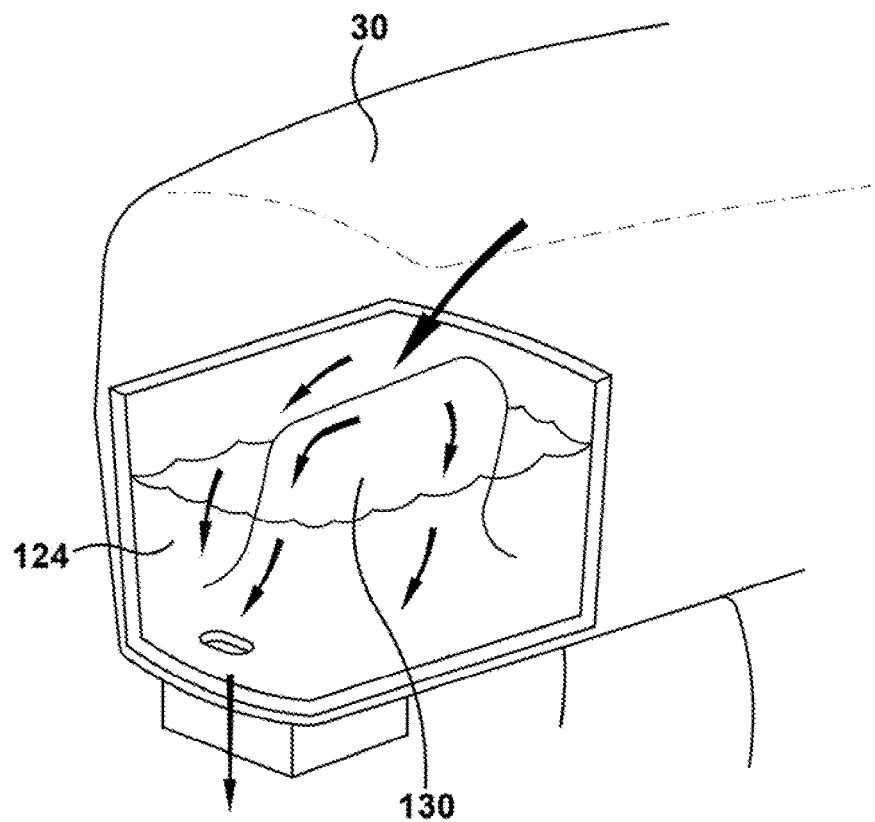
FIG. 30 depicts yet another alternative means for cooling and/or warming wine in the wine dispensing device utilizing a Peltier cooling device.
Figure 31:
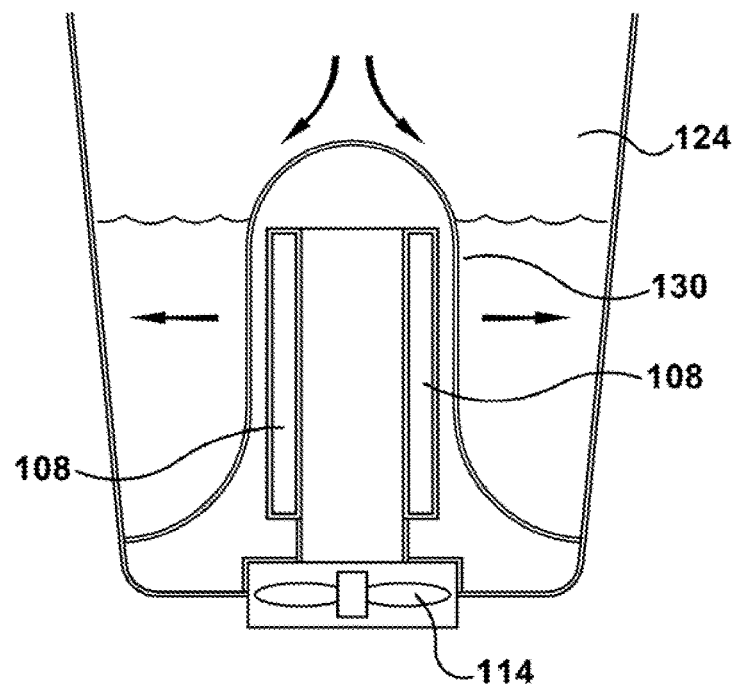
FIG. 31 depicts a front cut-away view of the means for cooling and/or warming wine in the wine dispensing device of FIG. 30.
Figures 32, 33:
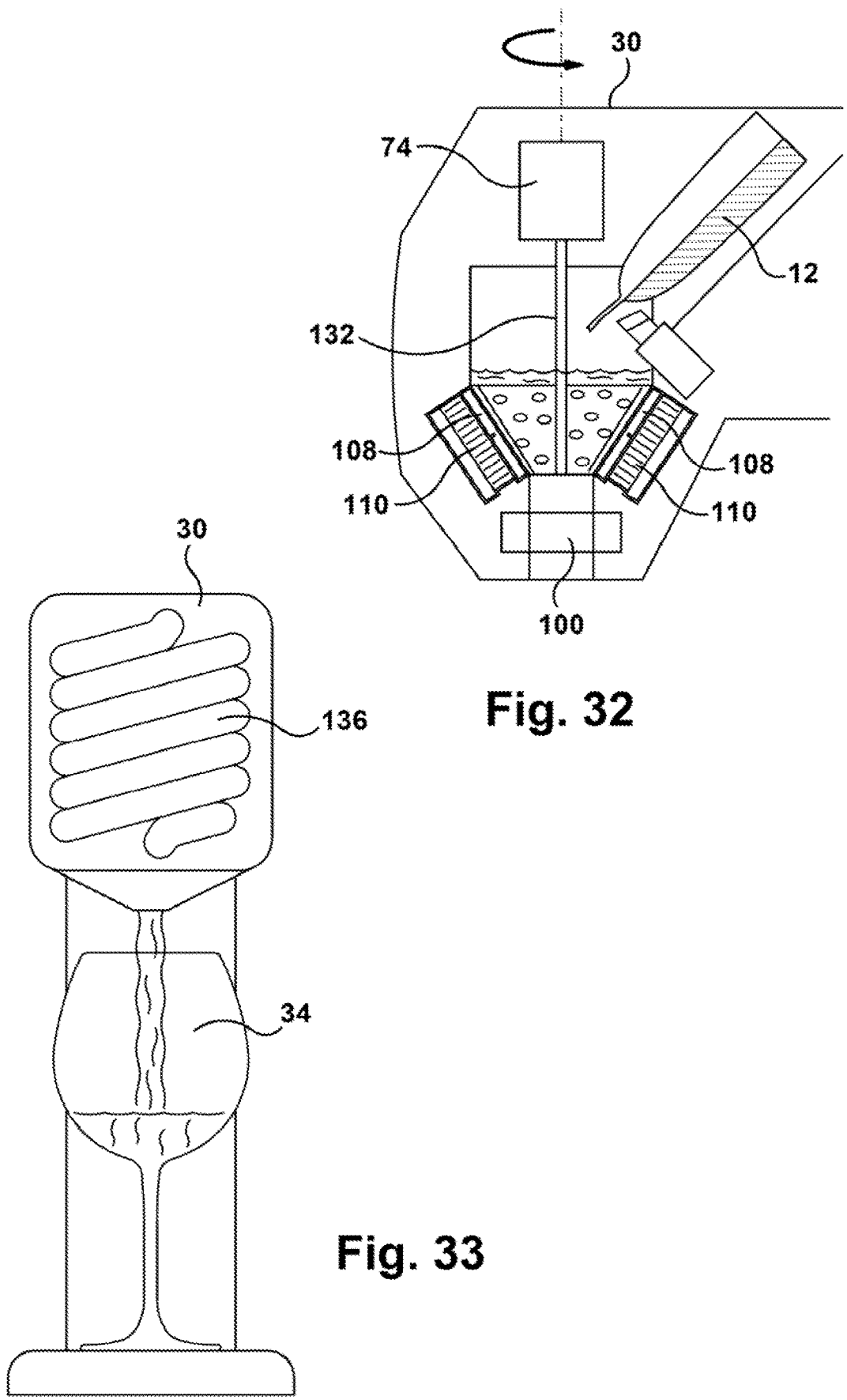
FIG. 32 depicts a further alternative means for cooling and/or warming wine in the wine dispensing device utilizing a Peltier cooling device.
FIG. 33 depicts yet another alternative means for cooling and/or warming wine in the wine dispensing device utilizing a Peltier cooling device.

FIGS. 30 and 31 depict an alternative cooling system. In this system, wine spills into a discharge reservoir that also serves as a cooling reservoir. A projection or cooling column 130 is positioned in the center of the cooling reservoir and one or more Peltier coolers are positioned in the projection for cooling the wine in the reservoir. Wine flows onto the cooled projection and spills down over the projection into the reservoir. The discharge opening of the reservoir can be closed by a valve such that a temperature of the wine is measured with a sensor before the wine is discharged from the discharge receptacle. FIG. 32 depicts the orientation of two Peltier coolers that are positioned so that the cold sides of the coolers are positioned outwardly, and the warm sides are positioned inwardly and face one another. A fan is used to help cool the hot sides of the Peltier coolers.

FIG. 32 depicts another alternative cooling system that utilizes a spinning chamber or blade 132 that moves wine to aerate it while the wine is being cooled. The blade is operated by a motor 134 which spins the blade about a vertically extending axis. The movement created by the spinning blade increases turbulence, which speeds the aeration and heat transfer within the chamber. In this embodiment, wine leaves the pouch 12 after being cut by a cutter and spills into a discharge chamber. The discharge chamber is v-shaped and leads to a dispensing nozzle. Peltier coolers are positioned on opposite sides of the discharge chamber for cooling wine in the chamber. The discharge valve may be closed by a solenoid valve or other valve. A temperature sensor can be used to measure the temperature of the wine. Once the wine reaches a desired temperature, the valve is opened, and the wine exits the discharge chamber through the discharge nozzle.

FIG. 33 depicts a schematic of yet another alternative cooling system that utilizes cooling coils 136 that extend outwardly from a front surface of the head of the device 10. The coils may be disposed for viewing. The coils could be transparent tubing so that a user can view wine in the coils as it is chilled. The coils may be positioned directly adjacent to a discharge reservoir and outlet so that wine falls from the coils into the discharge reservoir for dispensing through the discharge outlet. In this embodiment, the Peltier cooler is positioned inside the machine and is coupled to and positioned directly adjacent to the coils. The coils could also be positioned inside the head of the machine so that they are not visible to the user. The Peltier cooler chills the wine in the coil inside the machine.

Figure 34:
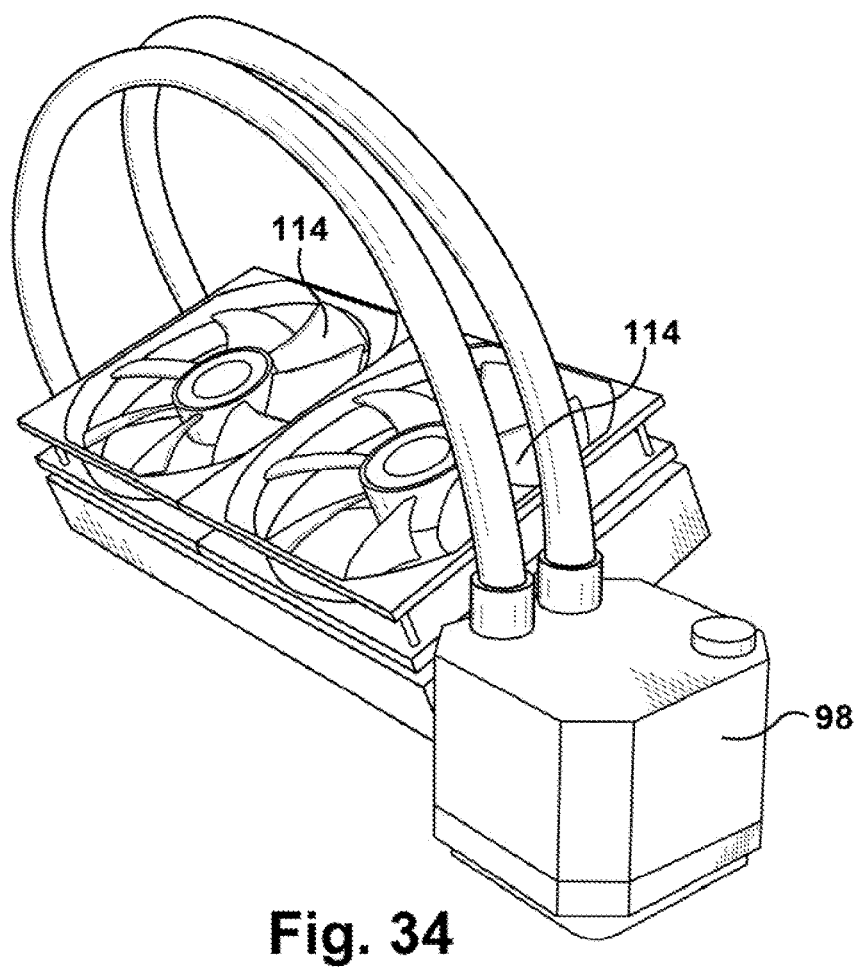
FIG. 34 depicts a component for use with the Peltier cooling device for drawing heat away from or towards the Peltier cooling device.

FIG. 34 depicts a fan and heatsink for use with the system. The heatsink has tubing extending therefrom that is coupled to a pump for pumping fluid through the heatsink. The heat sink could be a copper heatsink. A PCB board may be used with the system, although not shown. Color sensors (not shown) could be used for reading a color barcode on the pouch 12.

Figure 35:
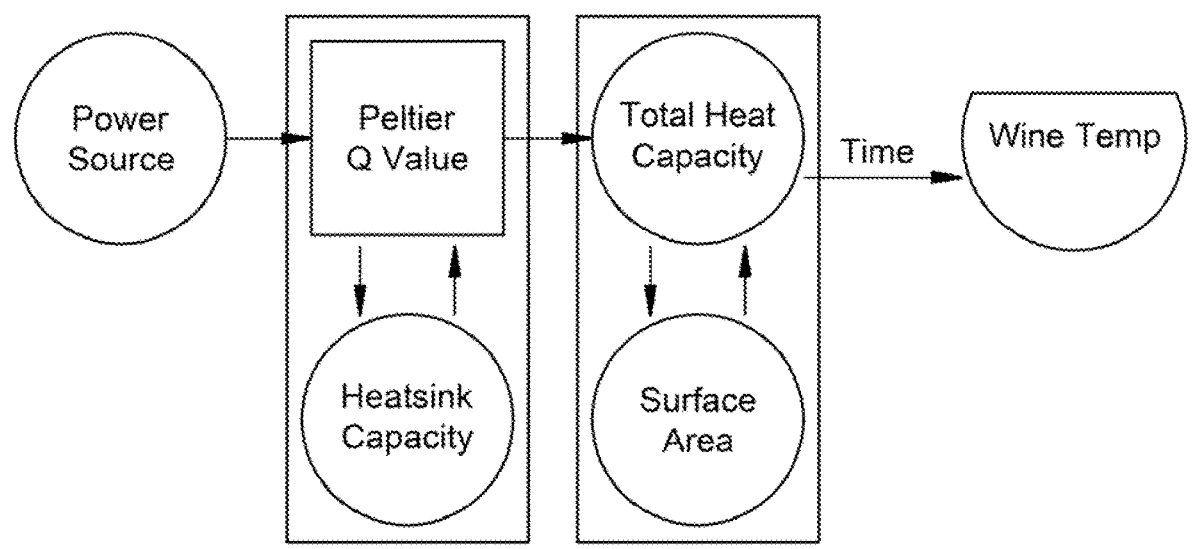
FIG. 35 depicts a schematic of the cooling system of the wine dispensing device.
Figure 36:
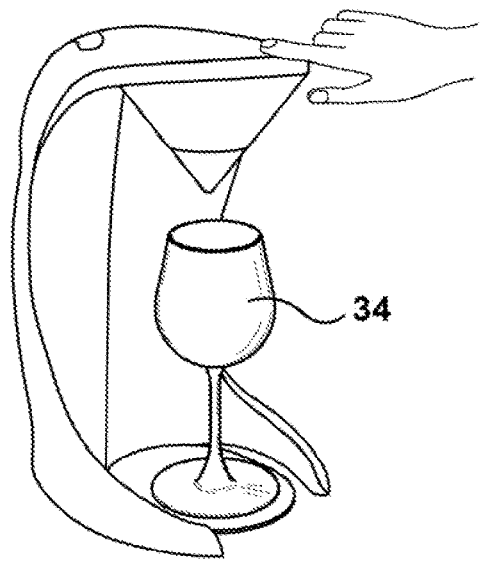
FIGS. 36-43 depict various operational steps for the example wine dispensing device.
Figure 37:
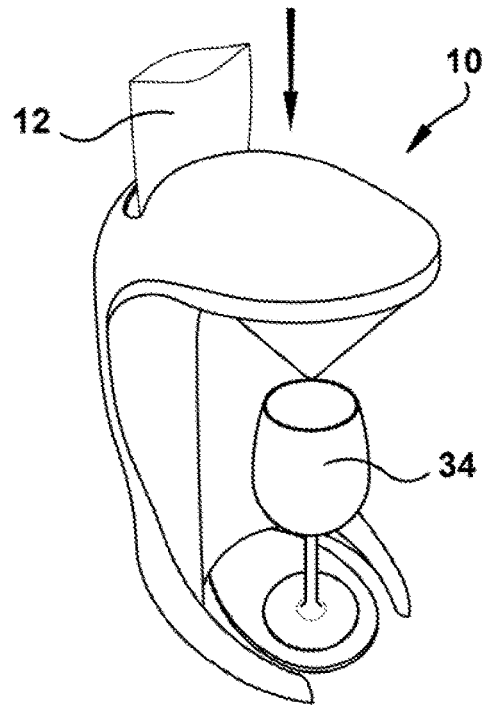
Figure 38:
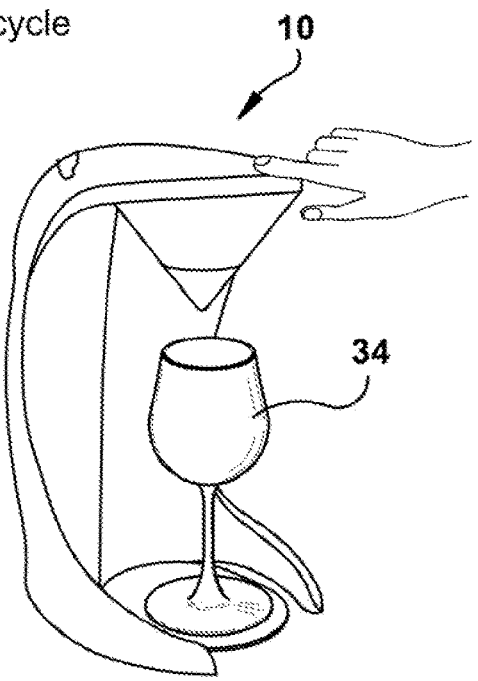
Figure 39:
Figure 40:
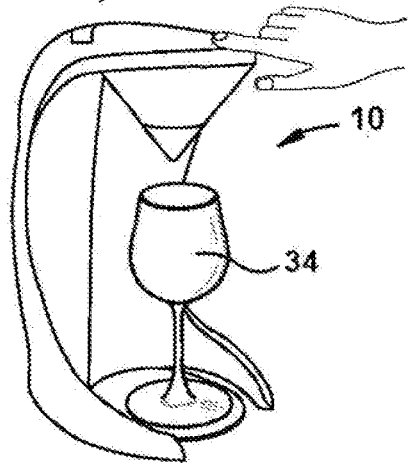

FIG. 35 depicts an overview of the cooling technology utilized with the invention, including various variables that are relevant to the system. Changing any variable will require reevaluating every component in the system. All variables directly affect one another. Each time a variable changes, different components must be selected to stay in the operating range.

FIGS. 36-39 depict the main process a user experiences for dispensing wine utilizing the wine dispensing device 10. Step 1 requires the user to activate the system by touching an activation button on the device 10. This button, when pressed, lights up and the pre-chilling process begins. Button activation also serves to open the pouch door. Step 2 involves inserting the pouch 12 into the device 10 through the pouch door. Step 3 involves touching the button again. Once the button is touched a second time, the button will light up again, but with a different color to show that the button has been touched twice. When the user presses the button during step 3, the pouch receptacle door closes, and the dispensing cycle begins. This cycle involves cutting, draining cooling, aerating, pouring, and auto-discarding of the empty pouch 12. Once the wine has been dispensed, the button light indicator indicates to the user that the glass can be removed.

FIGS. 40-43 depict additional steps in the user experience. Step 4 depicts a cleaning process that can be used with the system. To clean the device 10, the user presses and holds the activation button to run the rinse cycle. A water reservoir is positioned inside the housing and this reservoir holds water that is used for rinsing the system. The rinse cycle is used if different types of wine are dispensed from the device 10, so that the wines do not mix. The rinse cycle can also be used at the end of the day after all glasses of wine have been dispensed to rinse the device 10. Rinse water travels through the cooling system and is dispensed out of the dispensing nozzle, where it can be collected in a glass and disposed of.

Figure 41:
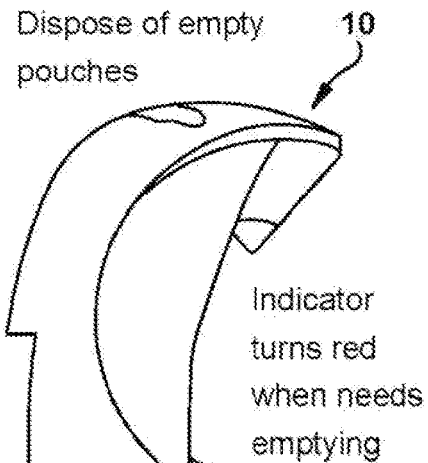

FIG. 41 depicts the user experience when the pouch discard bin is ready to be emptied. The activation button turns red, indicating that the wine pouch receptacle inside the device 10 needs to be emptied. The user empties the pouch bin by removing it from the rear side of the wine dispensing device 10, or by dumping the bin.

Figure 42:
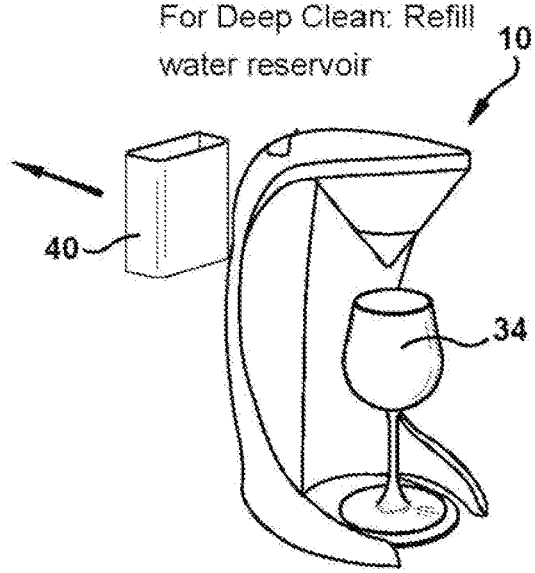

FIG. 42 depicts Step 6, which involves refilling the water reservoir for the cleaning cycle. In one embodiment, the water reservoir holds 3 cycles worth of cleaning water. The location for the water reservoir is inside the housing of the device 10. The water reservoir can either be removed from the housing to be refilled, or and can be provided with a spout formed in the housing to permit a user to pour additional water directly into the water reservoir without having to remove the water reservoir from the housing.

Figure 43:
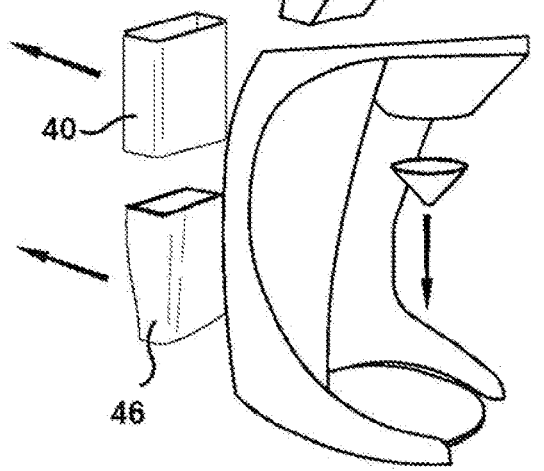

FIG. 43 depicts Step 7 in the additional process user experience. Step 7 describes a deep cleaning of the system. In this Step, the user removes the discard bin, decanter/discharge nozzle, water reservoir, and the pouch discharge bin. The pouch discard bin can be provided as a separate removable part of the device 10 that houses the pouch receptacle and the cutting mechanism for cutting open the pouch 12.

FIGS. 44-47 depict a user experience for the device 10 shown in FIGS. 2-5. In particular, the user touches the control button and the pouch door opens. The user then loads the pouch 12 into the pouch slot. The user then touches the control button for the second time to begin the dispensing cycle. This also causes the pouch door to close.

Figure 48:
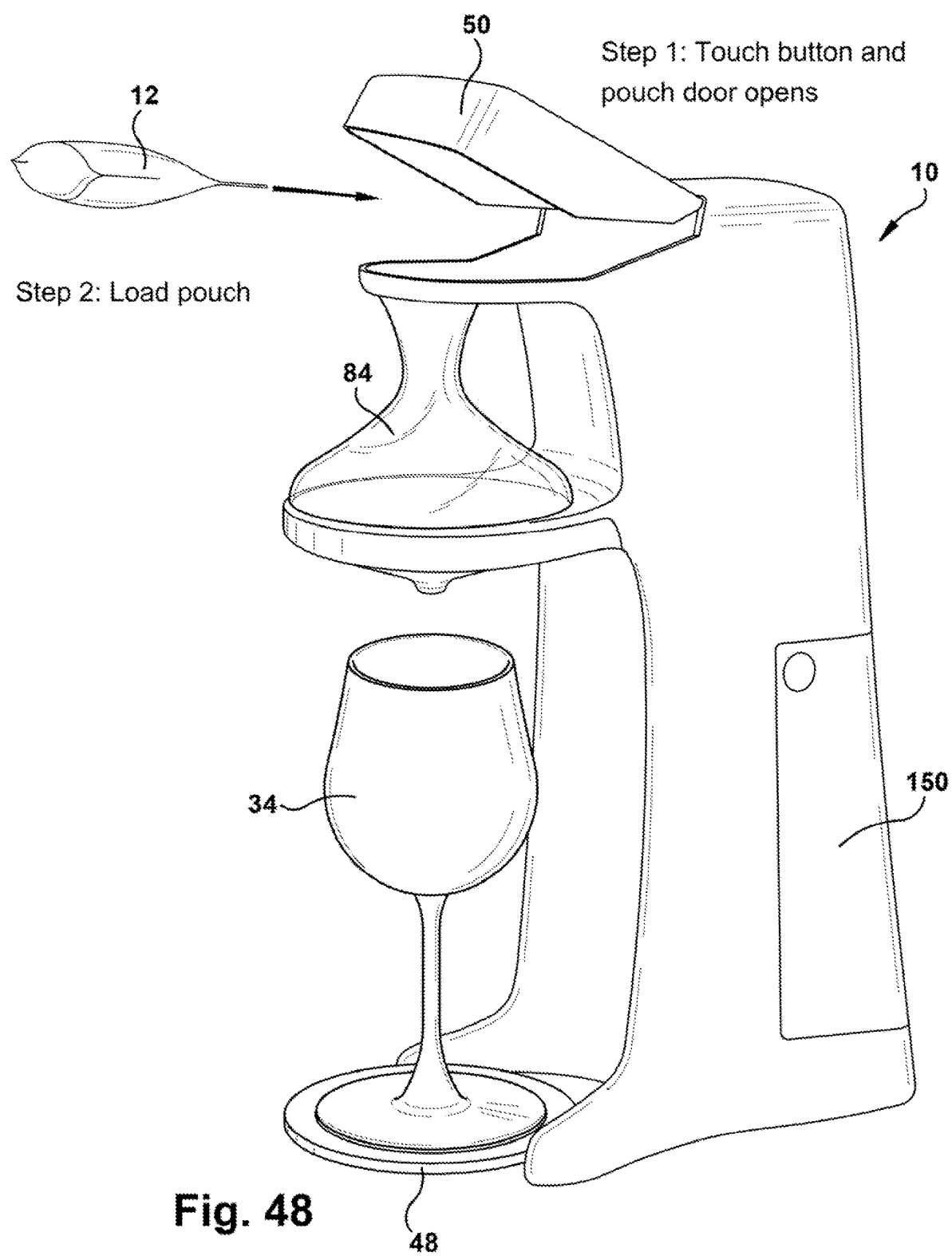
FIGS. 48-49 depict operational steps for yet another alternative embodiment of the wine dispensing device.
Figure 49:
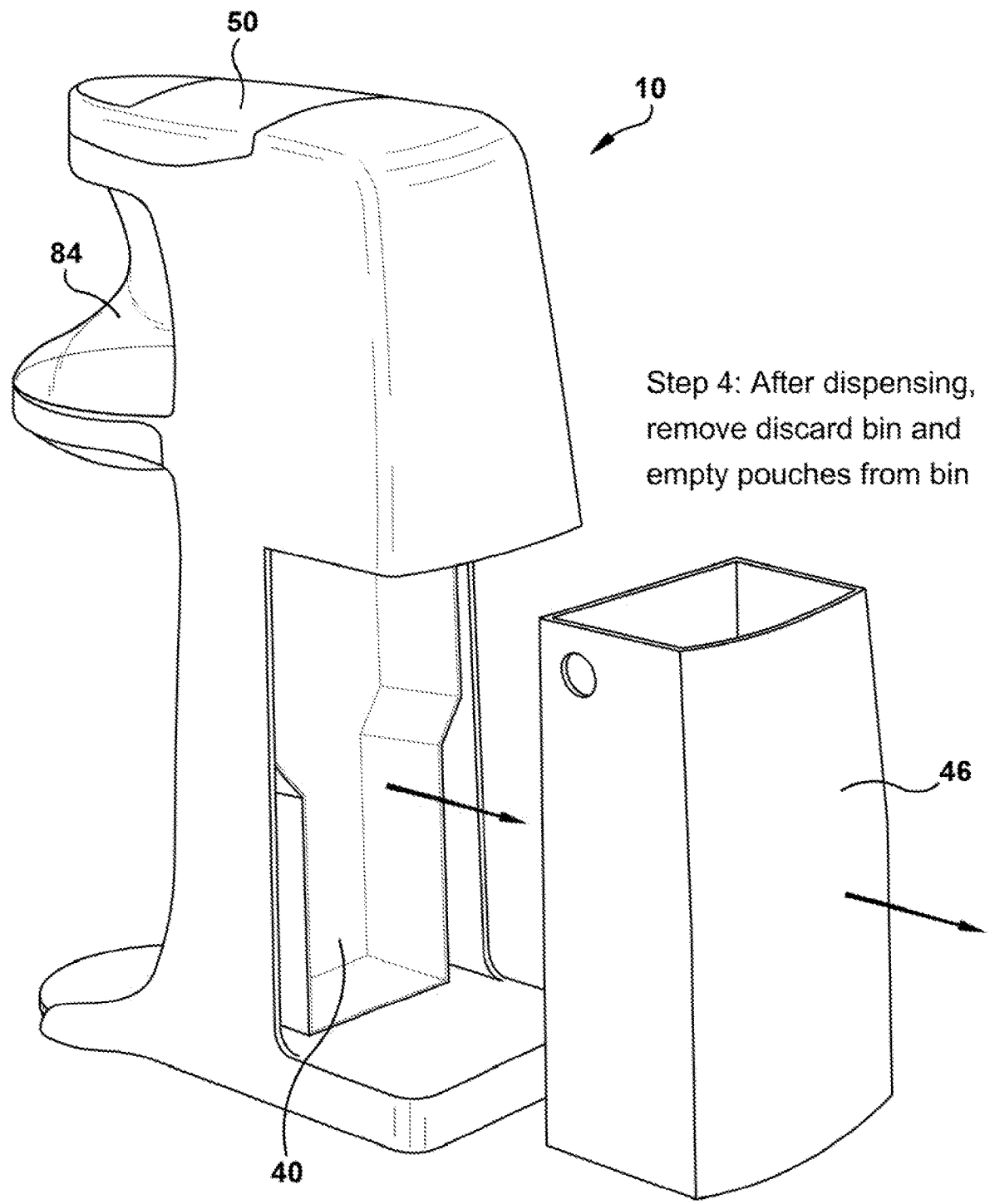

FIGS. 48-49 depict the user experience for the embodiment shown in FIG. 15. Similar to prior embodiments, the first step is for the user to touch the activation button and this starts the system and opens the pouch door. The pouch door in this embodiment is positioned on the front surface of the device 10. The door is hinged along the bottom edge of the device 10 and opens outwardly from the top. The user inserts a pouch 12 with the top end down into the pouch receiving slot. Then the user presses the button again, which begins the dispensing cycle and closes the pouch receiving door. Wine is dispensed through the outwardly extending spout.

An activation button is shown in FIG. 1. The activation button may be a single activation button that is used for all operations of the system. The button can include LED lighting that is associated with the button. The entire button could light up, or an area around the button could light up, or both. The LED lighting could provide different colors to signal different things to the user. In one indicator user experience, the button could glow red when the pouch discard bin is full, indicating to the user that the bin needs to be emptied. In addition, when the pouch discard bin is full, programming could be used to lock the device 10 from operating any further until the bin is emptied. During the rinse cycle, the light could rotate slowly while running the cycle to show processing. When the water reservoir that is used for cleaning is empty, a light associated with the button could glow blue to indicate that the water reservoir needs to be refilled before it will run the next pouch 12. The button is shown positioned at the front top edge of the device 10, but could be positioned at other locations, if desired.

Figure 44:
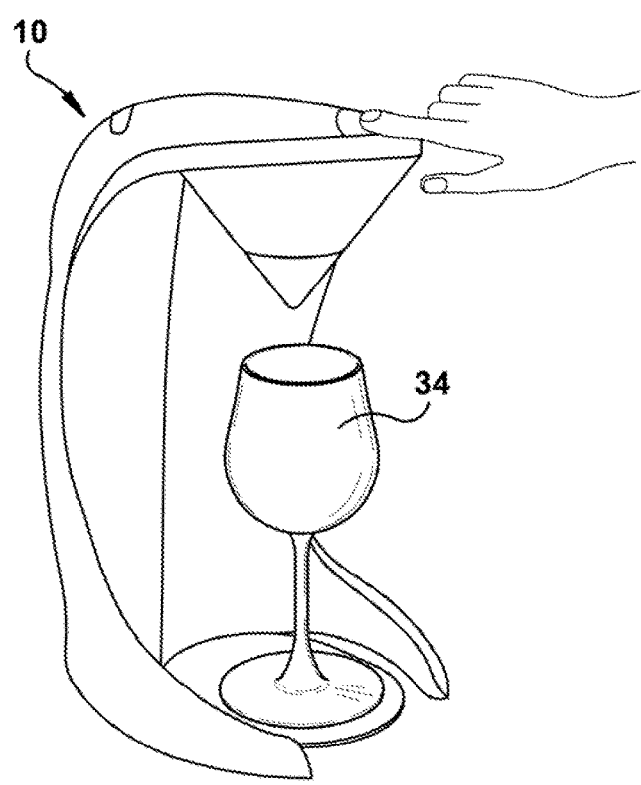
FIGS. 44-47 depict various operational steps for an alternative example wine dispensing device.
Figure 45:
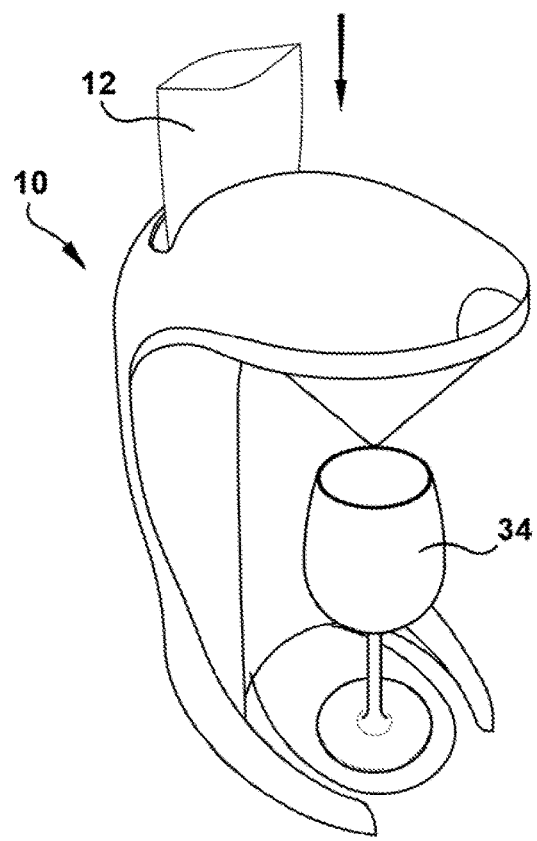

FIGS. 44-47 depict system operation that is associated with the activation button. FIG. 44 depicts the start-up mode of the device 10 and involves step 1 of touching the button to turn on the machine and open the pouch door. On start-up, the light rotates around the button indicating internal processing of the device 10 and that the device 10 is not yet ready for the pouch 12 to be inserted. In FIG. 45, a second step shows that the device 10 is "ready" and that the pouch door has been opened and a pouch 12 can be inserted into the device 10. When the device 10 is "ready", the indicator light of the activation button becomes solid or fades in and out before the pouch 12 is inserted to indicate readiness/waiting.

Figure 46:
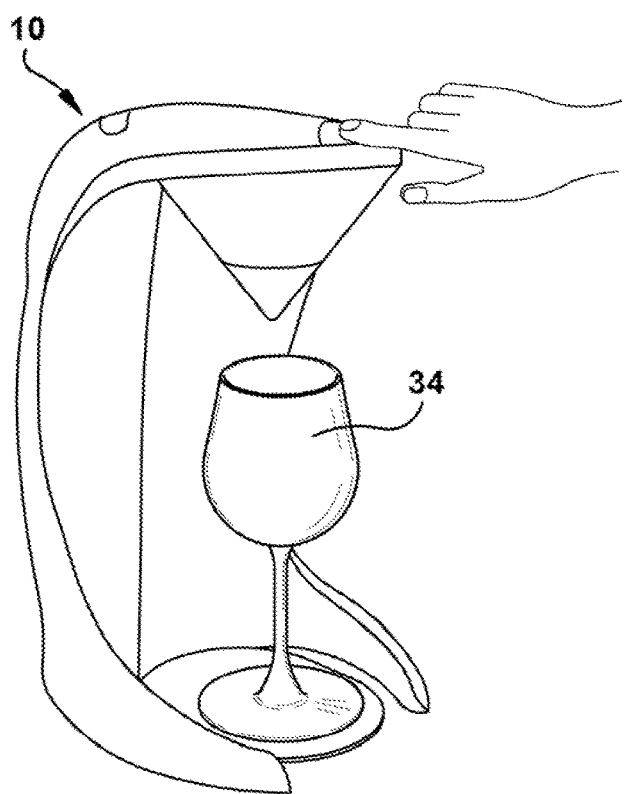
Figure 47:
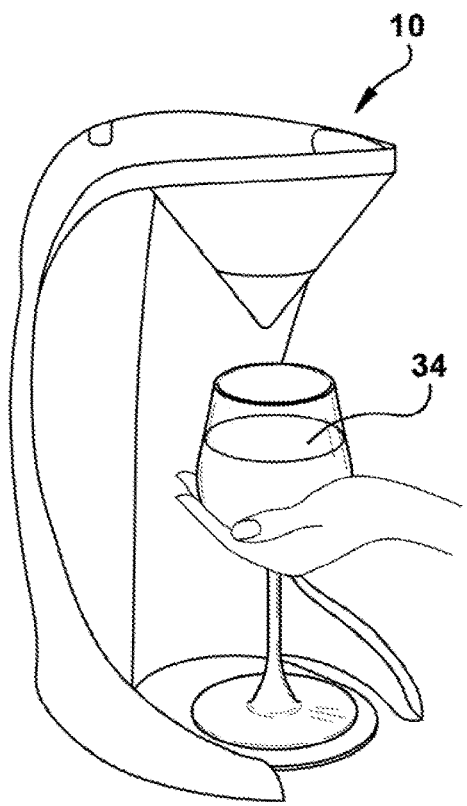

FIG. 46 indicates the processing step of the device 10. In step 3, the user again touches the activation button to close the pouch door and to start the operational cycle of the device 10. During processing, the light glows solid and bright when the button is pressed to show confirmation. After dispensing has occurred, as shown in FIG. 47, and the dispensing cycle has been completed, the activation button blinks twice, then stays solid to indicate completion of the process. Other signals can be used, including blinking and solid lights and different colors, as well as different parts of the button being lit, or around the button.

FIGS. 48 and 49 depict a user experience for the device 10 shown in FIG. 15. In the embodiment shown in FIG. 48, the user presses the activation button, which causes the pouch door to open. The user loads the pouch 12 into the opening and then touches the button again, as shown in FIG. 49, to close the door and begin the dispensing cycle. FIG. 49 also shows the location of the water reservoir inside the device 10 as well as removal of the discard bin for emptying used pouches 12. The discard bin can hold at least 3 pouches 12, but possibly more. The discard bin can be removed from the device 10 and emptied without having to touch the pouches 12, thus avoiding sticky fingers. While the button is used to open and close the door in this embodiment, the user could alternatively open and close the door manually.

Figure 50:
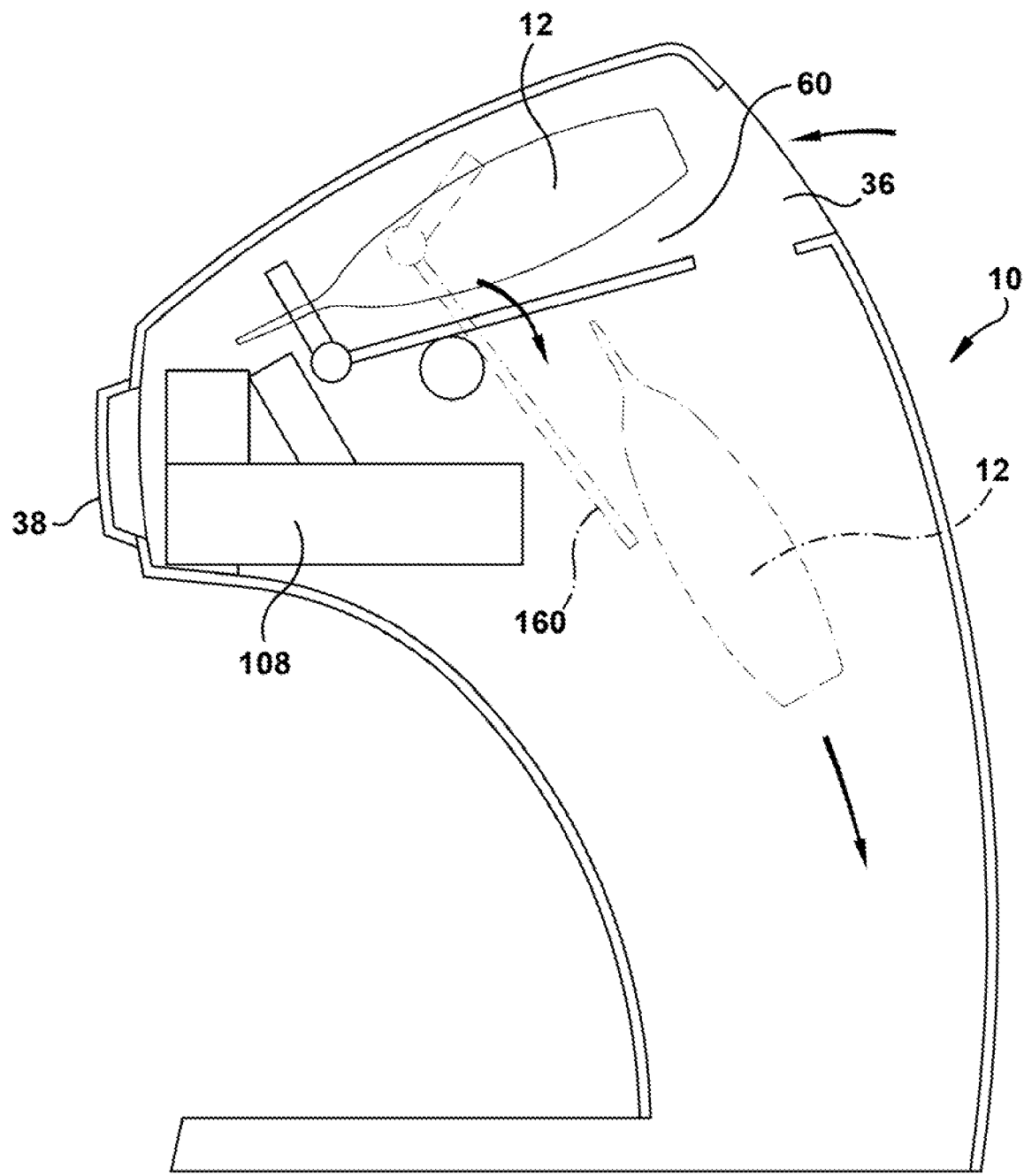
FIG. 50 depicts a cutaway side view of an alternative embodiment of a wine dispensing device having a rear loading slot.

FIG. 50 depicts an alternative embodiment of the device 10 that has an opening for loading pouches 12 into the rear of the device 10. In this embodiment, there is no door for inserting the pouch 12. The user simply inserts the pouch 12 top first into the rear slot until the pouch 12 seats in the pouch receptacle. The pouch 12 is cut in the pouch receptacle and wine flows into the front of the device 10, where it is cooled. The device 10 includes a viewing window to allow the user to see the wine as it is being processed. The cooler and any aeration devices are positioned at the front end of the head of the device 10 and an opening in the housing of the device 10 is positioned below a discharge opening so that a glass can be positioned under the discharge opening. This embodiment shows a swing door that permits the pouch 12 to rotate and be discarded into a discard bin.

Figure 51:
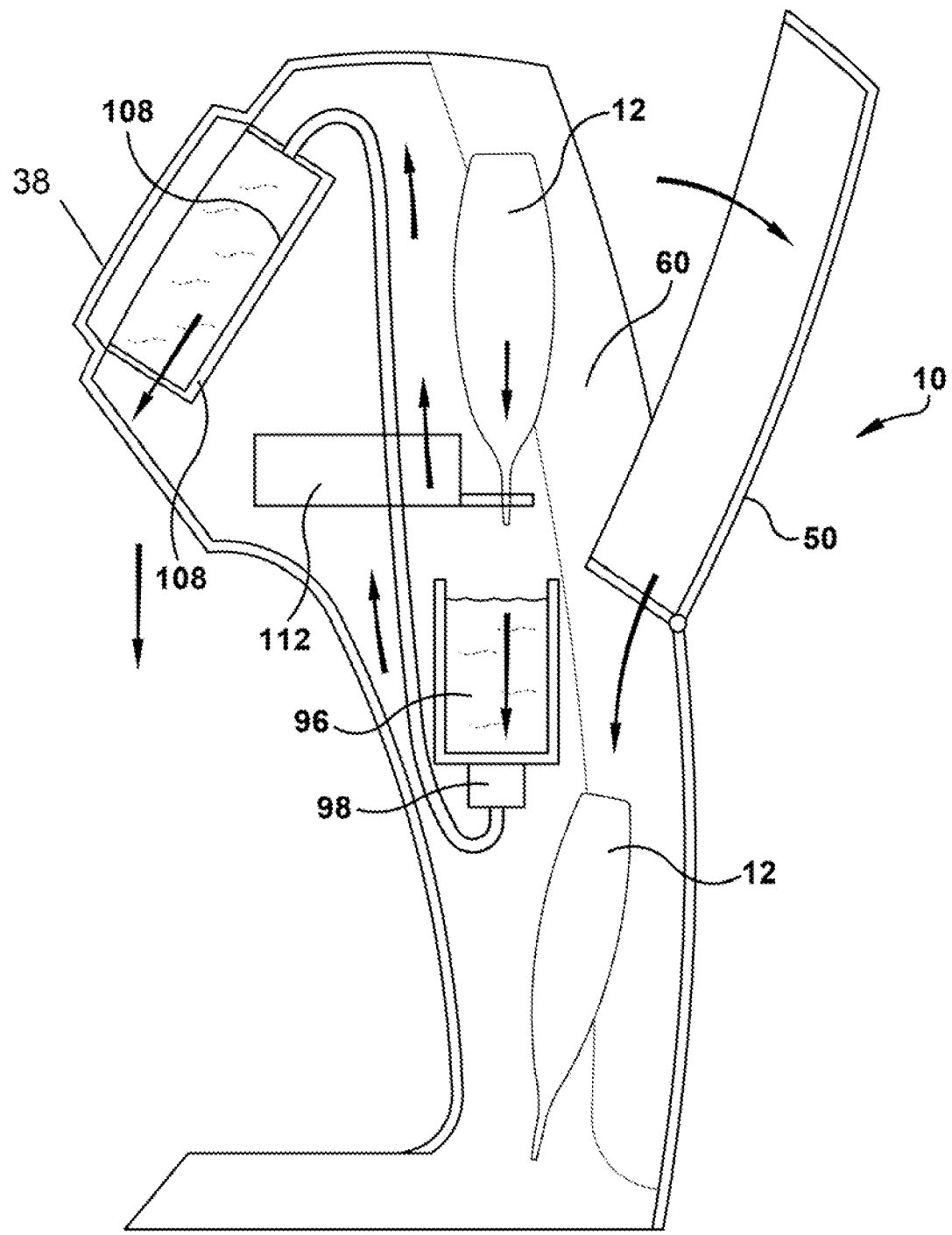
FIG. 51 depicts a cutaway side view of an alternative embodiment of a wine dispensing device having a rear loading door.

FIG. 51 depicts another alternative embodiment of the device 10 where the pouch opening for loading pouches 12 is positioned on a rear surface of the device 10 under a door. The door is hinged to the housing at a lower end of the door on the rear surface of the device 10. The door can be opened manually or can be opened by touching a button that operates a servo to open the door. Once the door is opened, the user inserts the pouch 12 into the pouch receptacle inside the housing. The pouch 12 is inserted with the top end down. Once the pouch 12 is positioned in the receptacle, the pouch 12 is opened with a cutting mechanism or slicing mechanism and wine is permitted to flow into a wine receptacle. Aeration can occur while the wine is in the wine receptacle or while the wine leaves the pouch 12. A pump is utilized to pump the wine to the upper end of the housing, where it flows into a Peltier cooler. The Peltier cooler is associated with a viewing window, where a user can view the wine being cooled. Then the wine can be dispensed from the device 10 into a glass. After the pouch 12 as been emptied it can move into the discard bin. The discarding process can be tied to the rotation of the door such that the pouch 12 moves into the bin as the door is opened, for example. Alternatively, as discussed above, other techniques for pouch discarding can be used.

Figure 52:
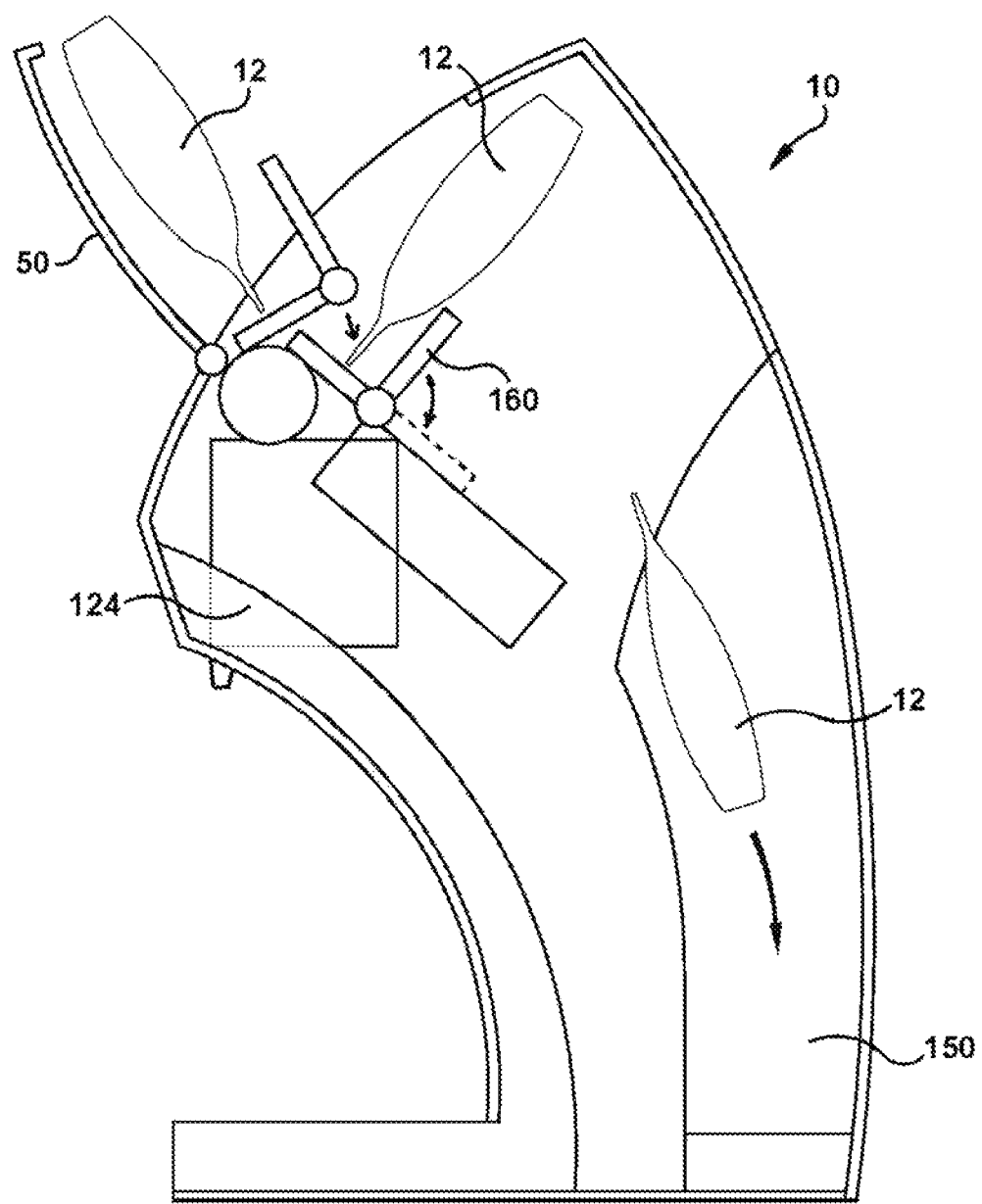
FIG. 52 depicts a cutaway side view of an alternative embodiment of a wine dispensing device having a top loading door and a bin for catching a used pouch.

FIG. 52 depicts an alternative embodiment where the pouch door is positioned on top of the device 10 near the rear of the device 10. In this embodiment, the user inserts the pouch 12 into the pouch receptacle, which is coupled to the door. The door is hinged to the upper end of the housing near the top center of the device 10. The door opens rearwardly. When the user closes the door, the pouch 12 rotates into the housing along with the rotation of the door, where it is cut and the wine in the pouch 12 is dispensed. The pouch receptacle then releases the pouch 12 into the discard bin.

Figure 53:
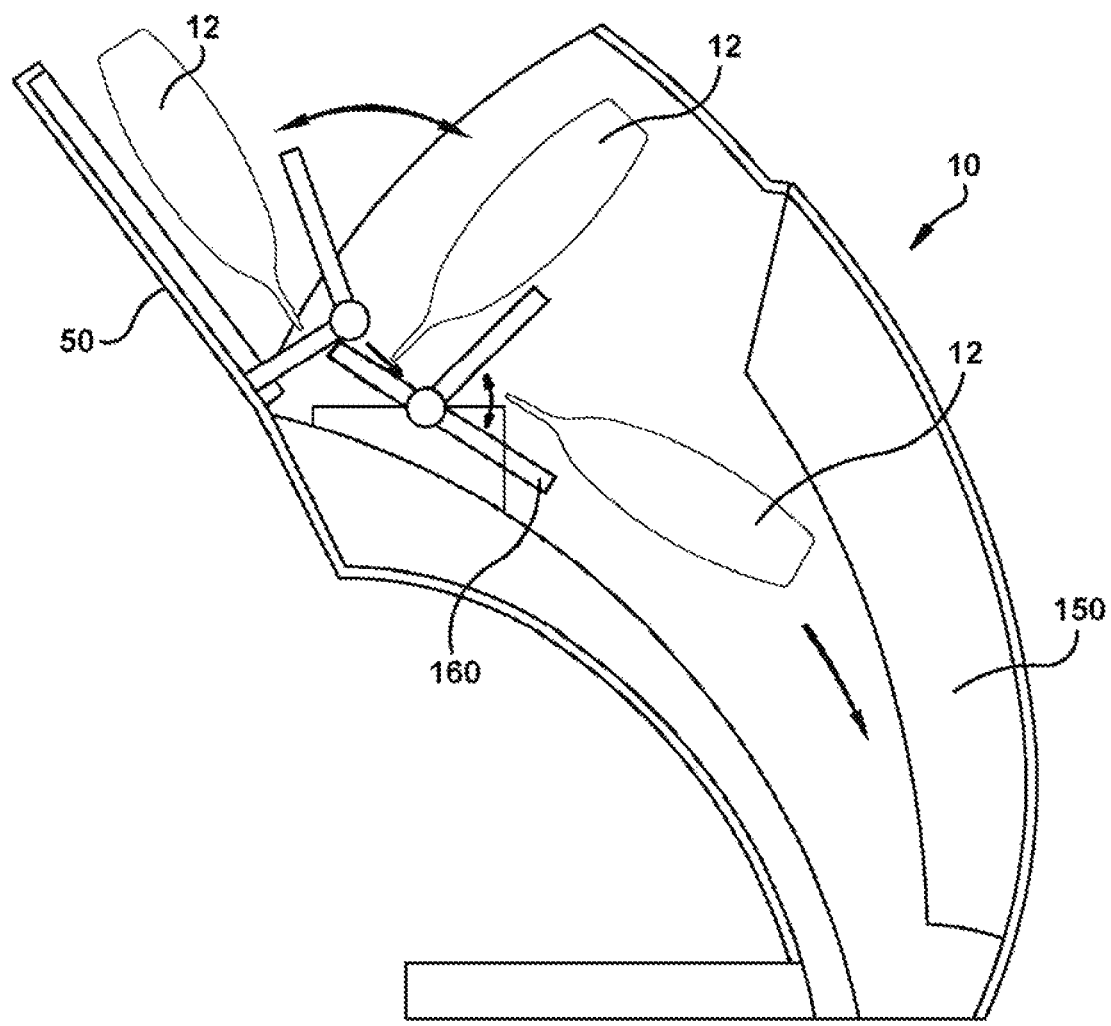
FIG. 53 depicts a cutaway side view of an alternative embodiment of a wine dispensing device having a top loading door with an alternative bin for catching a used pouch.

FIG. 53 depicts an alternative embodiment where the pouch door is again on the upper surface of the device 10. The pouch door is hinged to the upper surface adjacent the front end of the device 10. The pouch door, like with the embodiment shown in FIG. 69, has a receptacle for holding the pouch 12 in a vertical position. The user inserts the pouch 12 into the receptacle in a vertical position with the top end of the pouch 12 facing downwardly. The user closes the door either manually or with the touch of a button. The pouch 12 is cut by the cutting mechanism inside the housing, and then wine is dispensed from the pouch 12. The pouch receptacle has a trap door that rotates to force the pouch 12 to be discarded into a discard bin.

While only one activation button is shown, the device 10 could include multiple buttons or a touch screen or other input device(s) if desired. A different cooling system such as a water-cooled system or other system could be used for cooling if desired, although other systems tend to add significant cost.

Pouch:

The pouch 12 utilized with the invention is a flexible, soft pouch 12 with no hard-plastic parts. The pouch 12 can be a four-sided pouch 12 that is sealed entirely around a single edge of the perimeter of the pouch 12. Alternatively, the pouch 12 can be a stand-up pouch 12 that has a sealed, gusseted bottom, as known by those of skill in the art.

Figure 18:
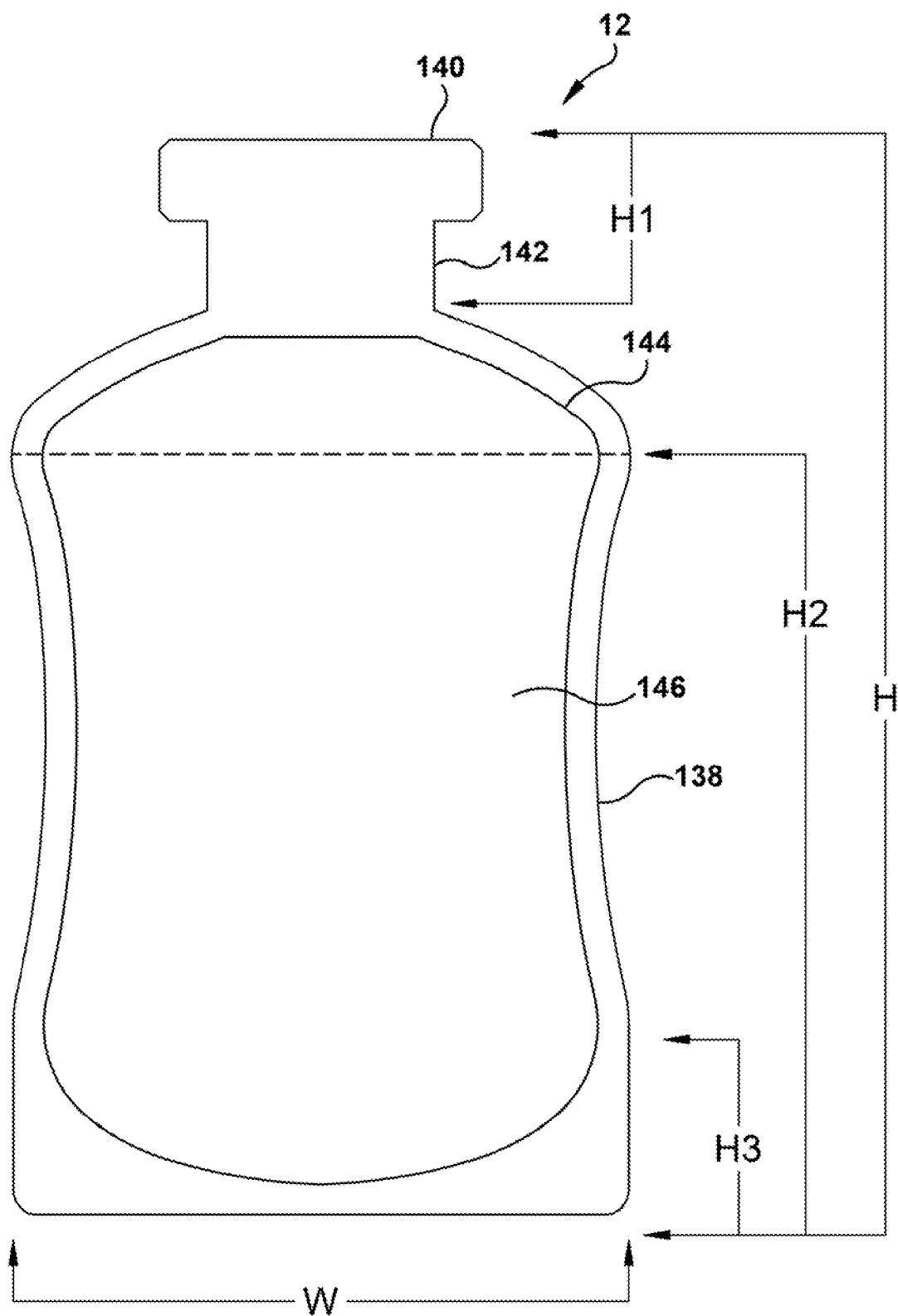
FIG. 18 depicts a front view of an alternative pouch that may be used with the wine dispensing device disclosed herein.

FIG. 18 depicts a first example pouch 12 having an outer perimeter 138 that resembles a bottle. The profile of the pouch 12 includes a rectangular cap 140, a rectangular neck 142, and sloping, curved shoulders 144 that extend downwardly from the neck. After the shoulders, the side edges of the pouch curve inwardly to a central location along the height of the shoulders, and then curve outwardly until hitting a vertical portion of the side edges. The vertical portion of the side edges is positioned directly adjacent to the bottom surface of the pouch 12, which is flat. The internal shape of the bladder 146 of the pouch 12 is shown as following the shape of the outer edges of the pouch 12. At the top end, the bladder starts directly adjacent to the bottom of the neck. At the bottom end, the bladder walls have a curved shape in the bottom corners. The curved shape does not match the exterior walls of the pouch 12 and instead is more rounded than the bottom of the pouch 12 shape, which is more rectangular. This pouch 12 has a width of about 3.75" and a height of about 6.5". The combined height of the neck and cap is about 1.0". H1 is about 1 inch, H2 is about 4 inches, H3 is about 1 inch, W is about 3.8", and H is about 6.5".

Figure 19:
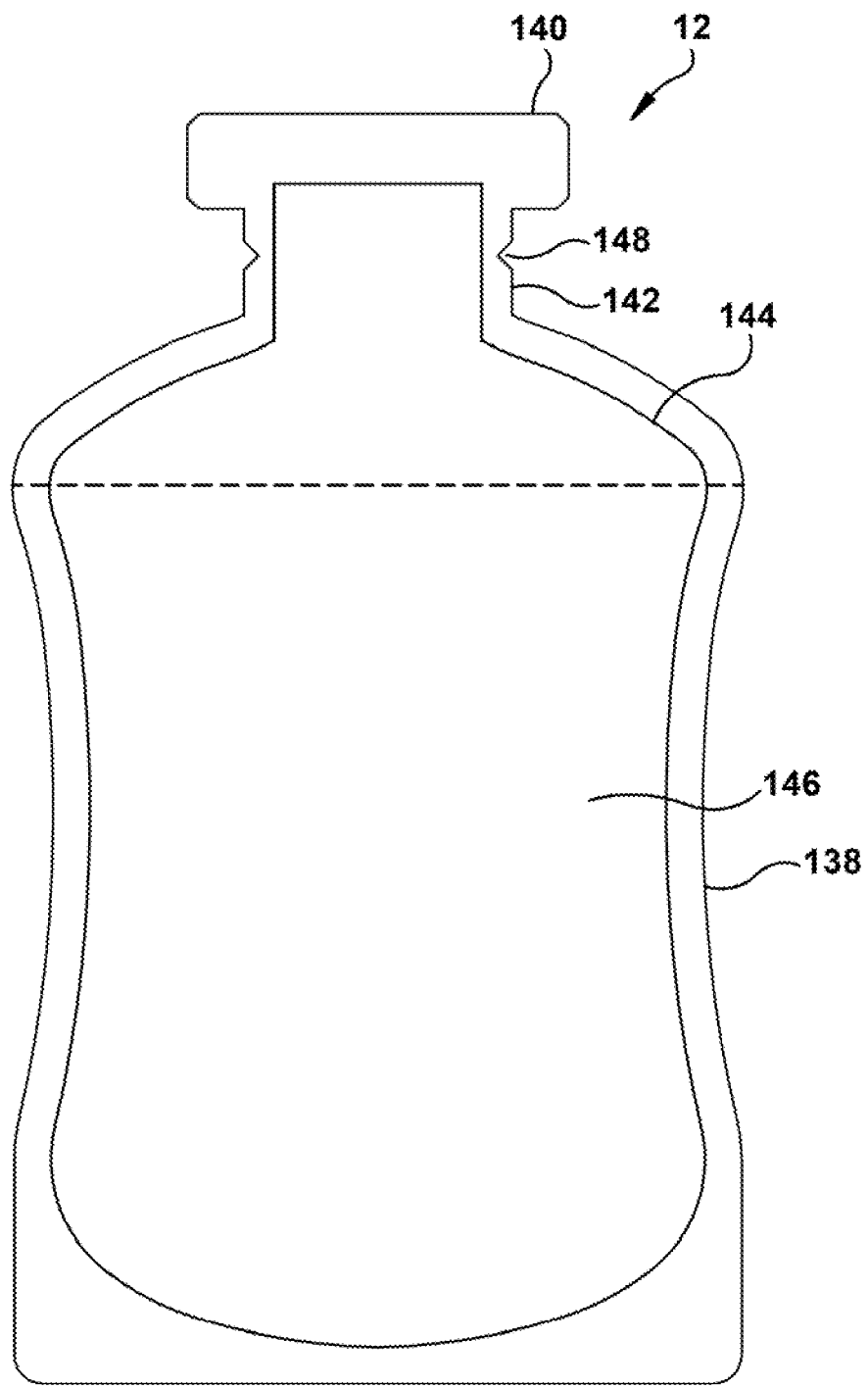
FIG. 19 depicts a front view of yet another alternative pouch that may be used with the wine dispensing device disclosed herein.

FIG. 19 depicts a pouch 12 shape similar to that shown in FIG. 18, but the bladder extends into the neck of the pouch 12 to the cap. In addition, the pouch 12 includes an indented tear portion 148 in the neck that permits the pouch 12 to be torn more easily. The tear portions in the neck are triangular.

The material utilized for the pouch 12 must permit the shelf-life of the wine to be at least 18 months and preferably at least 24 months. Types of materials that may be utilized include foil rolls such as: 12PET/9AL/12PET/70PE; 48 ga PET/60BON/4 mil PE; 100 Bon/100 bon/150 PE; 48 ga PET/48 ga METPET/4mill PE; 48 ga PET/5 mil PE; 48 ga PET/60 BON/5 mil PE; 0.92 mil Polyester/ADH/0.48 MET-PET/ADH/.60 mil Nylon/ADH/5.0 mil WLLDPEF; or 0.48 PET/0.48 MET PET/0.6 Nylon/3.5 EVOH coexfilm. Other materials presently known or developed in the future may alternatively be utilized.

Decanting:

The wine dispensing device 10 preferably includes one or more decanting systems. Multiple types of decanting techniques may be used to achieve agitation and aeration, such as gravity fed, disruption and venturis. The device 10 may also have a mechanism for filtering sulfites. A filter (not shown) may be used to reduce sulfites to a normal level. The filtering mechanism may be a filter that can be changed by a user. The filter may be washable and reusable or disposable.

Aeration opens the wine which maximizes the amount of surface area that is exposed to oxygen. Adding oxygen into wine rapidly speeds the fermentation process, aging the wine just before it is consumed. Studies show that both red and white wines benefit from aeration before consumption. Several known types of decanting include venturi decanting, diverting decanting, and umbrella decanting.

Figure 20:
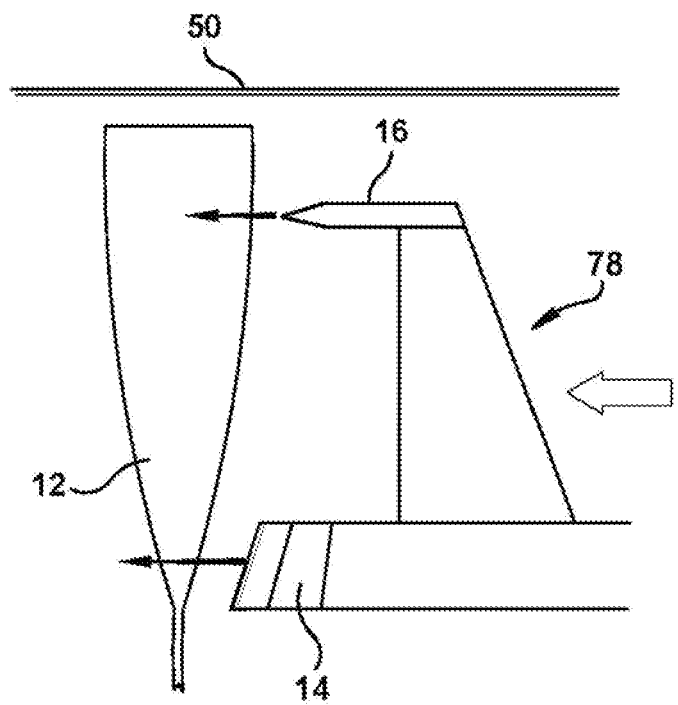
FIG. 20 depicts a cut-away side view of the wine dispensing device showing an aerating technique for aerating the wine in the pouch and an opening technique for dispensing wine from the pouch.

Venturi decanting is when the wine is forced through a small opening, which causes air to be mixed with the wine as it flows through the opening. In one example, such as shown in FIG. 20, that utilizes venturi decanting, a hole is punctured into the pouch 12 which allows air to enter the pouch 12, creating aeration and bubbling within the pouch 12. Then the pouch 12 is cut open using a knife or cutting blade, as shown being positioned near the bottom of the pouch 12, to release the wine in the pouch 12. The release of wine from the pouch 12 causes some aeration because air is mixed with the wine as it leaves the pouch 12. The cutting knife slices into the bottom of the pouch 12 and may be coupled to a spring-loaded cutter or could be coupled to a motor so that the cutting knife continuously slices back and forth for a period of time. The oscillation of the blade back and forth can help to clear the liquid from the pouch 12 and can also add some aeration to the wine. One size blade is shown. The blade could be larger or smaller. For example, the blade could have a height to cut into approximately 1 of the height of the pouch 12, ⅓ of the height of the pouch 12, or ½ half of the height of the pouch 12, among other heights. The upper end of the pouch 12 can be punctured to permit the introduction of air, which will help in the release of fluid from the pouch 12. A puncturing or cutting device 10 could be used to open the top end of the pouch 12.

Diverting decanting involves moving wine in a different direction to introduce some turbulence and associated oxygenation. Umbrella decanting is when wine flows over a body to cause turbulence and associated oxygenation. Umbrella decanting is a simple design that involves pouring wine over an umbrella shaped member and allowing the wine to flow over the umbrella shaped member and fall off the umbrella. This type of decanting requires sufficient height within the unit to permit the wine to fall from the umbrella.

Sediment removal is also typically a part of decanting. There are several ways to remove sediments from liquids including the simple solution of using a gold-plated filter similar to ones found in many coffee makers. Any type of filter that is used to pick up particulate matter will need to be replaced or changed over time. The filter could be stored in a drawer and be rinsed or dropped into a sliding drawer. The size of the filter only needs to be about the size of a quarter but could be larger.

There are multiple locations within the system where aeration can occur, including the following:
1) When the pouch 12 is cut by a cutting blade, the wine is aerated by the action of the blade on the pouch 12 because it adds air to the wine.
2) When the wine flows from pouch 12 into the wine receptacle. While the wine is in the receptacle, it is exposed to air which naturally aerates the wine.
3) When the wine is pumped to the cooling section, the action of the pump aerates the wine.
4) When the wine cascades through the wine sink/Peltier cooler, air is naturally added due to the turbulence that is created within the flow path. Even if the Peltier cooler surface is flat, it opens the wine up to more oxygen.
5) When the wine enters the dispensing nozzle, the wine swirls around the nozzle, which again causes the wine to be aerated.

There may also be other locations within the dispensing process where aeration occurs.

Figure 21:
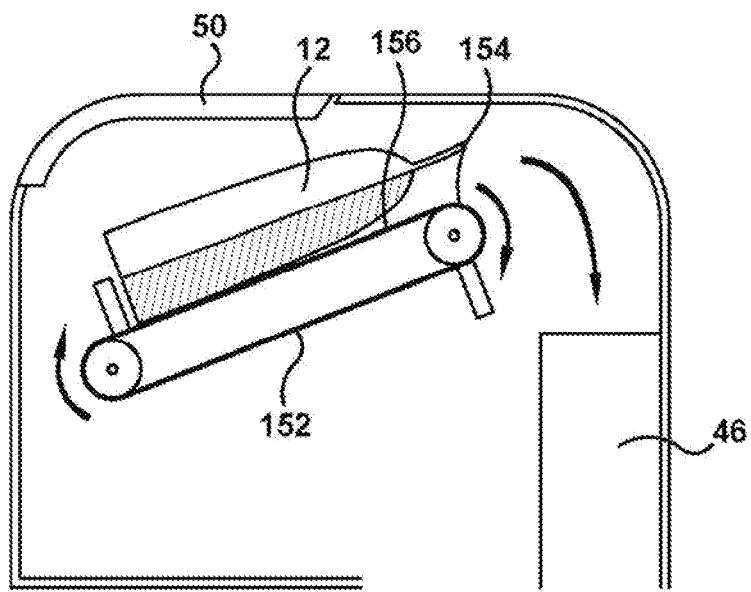
FIG. 21 depicts a cut-away side view of the wine dispensing device showing a first possible pouch disposal configuration.
Figure 22:
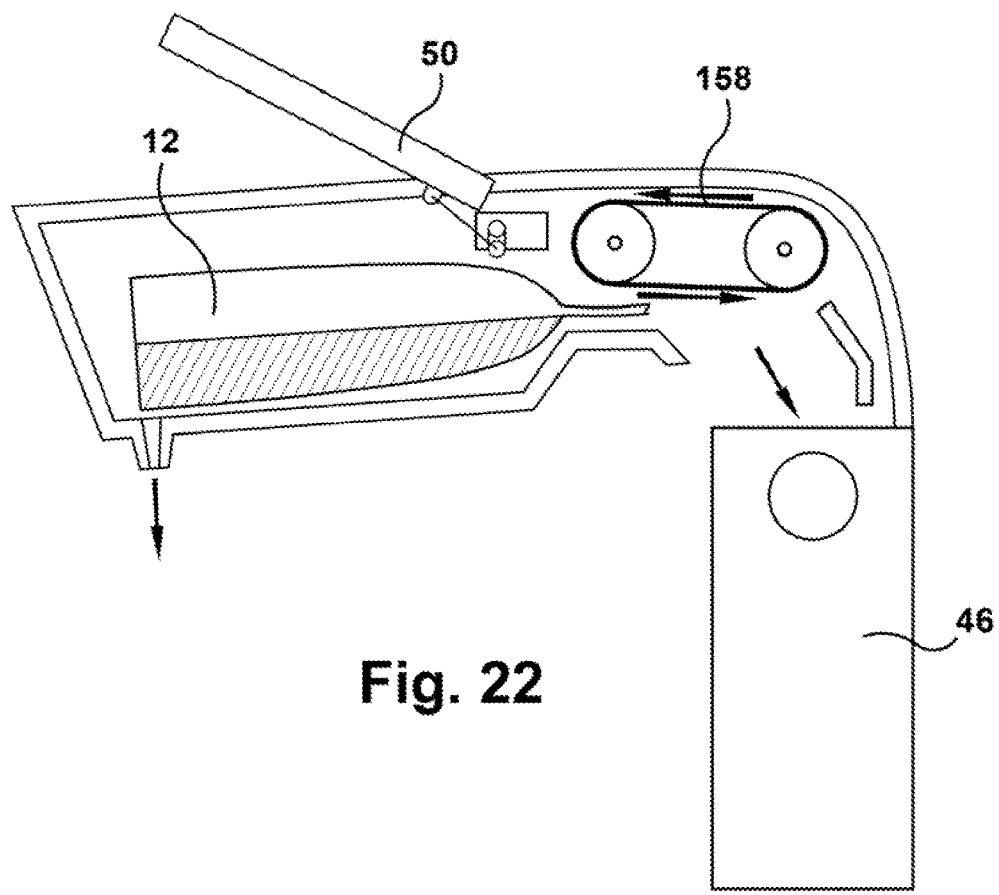
FIG. 22 depicts a cut-away side view of the wine dispensing device showing another possible pouch disposal configuration.
Figure 23:
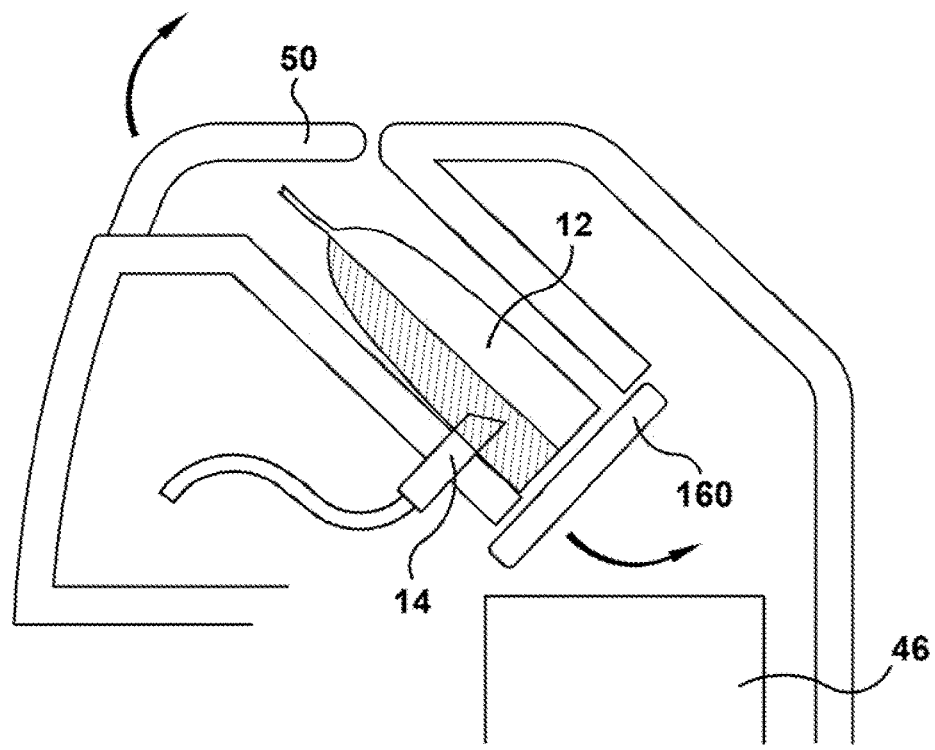
FIG. 23 depicts a cut-away side view of the wine dispensing device showing yet another possible pouch disposal configuration.

Pouch Discarding:

As previously discussed, the device 10 may include a system for discarding emptied pouches into a waste bin. The waste bin may be positioned on a rear surface of the device 10 and may include a door 150 that can be opened by the user to gain access to the discarded pouches. The waste bin may be positioned inside the housing but could be positioned outside the housing if desired. Different techniques for discarding pouches are shown in FIGS. 21-23. The techniques shown are non-exhaustive and it should be recognized that other discarding techniques could be used.

One type of pouch 12 discarding technique is belt paddle 152 discarding, as shown in FIG. 21. In this type of discarding, paddles push the packet over a "hill" or "peak" 154 of a ramp 156 and then the packet falls into a waste bin.

Another type of pouch discarding technique is a belt-driven discard, which is shown in FIG. 22. In this technique, a belt 158 grabs the top edge of the pouch 12 and pulls the pouch 12 through a small space, similar to a deposit slot of an ATM. The stickiness or rubbery nature of the belt helps to grab and pull the pouch 12. The pouch 12 is then led into a waste bin, where it falls by gravity.

Another type of pouch discarding is "trap door" 160 discarding, where a servo can remotely open and close a door to a waste bin. Once the door is opened, pouch 12 is permitted to fall into the waste bin. This type of pouch discarding device is shown in FIG. 23.

Different types of motors can be used to assist in discarding the pouch 12 after it has been cut and emptied. One type of motor is a stepper motor, which is a simple motor with a continuous position sensor. This type of motor provides full control over the number of rotations and position of the motor at all times. The stepper motor provides more freedom than a servo motor but involves more programming. The servo motor is a simple and inexpensive motor that provides automation with finesse. It has limited capabilities with only 180 degrees of rotation. There are, however, simple ways to convert rotational force into linear force for opening and closing a pouch bin. Another type of motor is a motor and switch. In this set up, the motor will run freely for a predetermined time until a switch turns off the motor. There is no position or rotation control unless switches are used to control position. This type of motor is most cost effective if standard servos or stepper motors are not robust enough.

A waste bin is positioned inside the housing and can be rotatable outwardly when a rear door on the housing is opened. The discard bin can rotate outwardly when the door opens in an automatic fashion or can rotate outwardly when the user pulls the bin out of the housing. Other types of discard bins can be used, if desired. In one embodiment of the device, the waste bin can hold 3-4 discarded pouches before it needs to be emptied.

In one example, a single servo is used to operate two doors that are associated with the waste bin. The entire floor flips orientation to ensure the pouches are ejected from the loading hopper.

The system also includes electronics that permit the system to work, including a PCB board, programming, LEDs, and other known parts.

EXAMPLES

To cool 60 oz. of liquid from 70 F to 50 F, the Peltier cooler must remove 7800 joules of energy at a target of 60 seconds, or 130 watts. As the liquid volume drops, the amount of energy required will drop. To remove 130 watts of energy, a Peltier cooler is chosen that has a combined rating of 130 Watts at a delta T of 20 F. As the Peltier cooler moves heat from one side of the cooler to the other side, it creates even more heat. To move the 130 watts of energy from the wine, the Peltier cooler creates an additional 125 Watts of heat that needs to be removed from the hot side of the Peltier cooler. A heatsink is used to remove all 255 Watts of heat from the hot side of the Peltier cooler such that the hot side of the Peltier cooler remains at room temperature.

A change in any of the variables associated with cooling requires reevaluation of every component. All variables directly affect one another. Each time a variable is changed, different components must be selected to stay within the preferred operating range.

Tests were performed using 6 oz of water, 5 oz of water, and 4 oz of water for periods of time of 60 seconds, 90 seconds, and 120 seconds. The target temperature drop was 20 degrees F. (−6.7 degrees C.). For 6 oz of water, the total energy removed was 7832.4 joules. For 5 oz. of water, the total energy removed was 6524.7 joules. For 4 oz. of water, the total energy removed was 5221.6 joules.

The following test results were achieved:

| 6 oz. at ΔT 20 F. | 5 oz. at ΔT 20 F. | 4 oz. at ΔT 20 F. |
| --- | --- | --- |
| 60 seconds = 130.54 W | 60 seconds = 108.75 W | 60 seconds = 87.03 W |
| 90 seconds = 87.02 W | 90 seconds = 72.5 W | 90 seconds = 58.02 W |
| 120 seconds = 65.27 W | 120 seconds = 54.37 W | 120 seconds = 43.51 W |

Based upon the test results, it was determined that the device 10 could move 160 Watts of heat at a ΔT 15 C by using two Peltier coolers that were powered at 12 volts. The Peltier coolers would draw 10.4 Amps of power.

The wine dispensing device 10 may include a window for viewing the wine during the dispensing process. Aeration may be a visual feature, with the aeration being performed in a window or in part of the device 10 that protrudes from the machine. The device 10 would be used to show swirling and opening of the wine.

While the device 10 has been described as performing a cooling/chilling function, the device 10 could also perform a heating/warming function if the wine temperature is too low. This can be performed using the same Peltier cooler by flipping the current on the cooler from the cold side to the hot side.

The Peltier coolers utilize fans that help to draw away heat from the hot side of the Peltier cooler. These fans may be positioned in the back of the device 10 so that hot air is not blown towards a user.

The wine dispensing device 10 can be stored under an upper cabinet, but, in use, depending upon the type of door utilized, it may be necessary to pull the device 10 on the counter out from underneath the upper cabinet.

If the pouch 12 that is inserted is already cool enough at the start, a temperature reading that is taken will determine this and then programming will instruct the device 10 to run through the cooling cycle for a 1-minute period for decanting purposes.

The device 10 utilizes a cleaning technique that permits a quick rinse of the system. A deeper clean can be achieved by disassembling the device 10. The device 10 includes a small reservoir of water for use in the quick rinse cycle.

The wine dispensing device 10 is disclosed in the context of wine. It is envisioned that the device 10 could be used for dispensing other types of fluids, such as water, liquors, cocktails, or other products. Different types of pumps can be used for performing various steps within the system, including: positive displacement pumps and centrifugal pumps, such as rotary positive displacement pumps, reciprocating positive displacement pumps, various positive-displacement pumps, helicon-axial pumps, twin-screw pumps, progressive gravity pumps, and electrical submersible pumps, among other types of pumps.

While the technology described herein is discussed in the context of a single-serve device 10, the device 10 could be modified to cool greater quantities of wine, if desired. For example, a pouch 12 having multiple glasses of wine could be utilized and cooled in bulk or cooled by the glass.

According to one embodiment, a beverage dispensing device includes a housing, a receptacle, means for opening the beverage container, a thermoelectric cooler, an aeration component, and a discharge nozzle. The housing has a flow path. The receptacle in the housing is for receiving a beverage container that houses a beverage and for discharging wine into the flow path. The means for opening the beverage container is for releasing the beverage therefrom. The thermoelectric cooler is positioned in the housing for one of chilling or warming the beverage along the flow path. The aeration component is for aerating wine in the flow path. The discharge nozzle is coupled to the flow path for dispensing the beverage from the housing.

The thermoelectric cooler may cause aeration and includes one or more of fins, projections, a circuitous path, and a flat surface. The thermoelectric cooler may be a Peltier cooler coupled to a cooling system. The Peltier cooler may include a cooling surface coupled to projections that extend outwardly from a surface of the cooler, said projections for receiving the beverage such that the beverage flows through and around the projections, creating turbulence in the beverage flow. The projections serve an aeration function for the beverage. The cooling system may include one or more of a pump, a valve, a cooling block, a radiator, and cooling fluid circulating through the radiator.

The device may also include activation hardware and software for activating the device to cool and dispense wine from the beverage container. The device may also include a discharge bin coupled to the receptacle and a discharge mechanism coupled between the receptacle and the discharge bin. The beverage container is moved from the receptacle to the discharge bin via the discharge mechanism after the beverage container has been substantially emptied of the beverage. The discharge bin is associated with a rear surface of the housing.

The housing may include a head having a top surface having an opening for receiving the pouch 12. The opening is coupled to the receptacle. The housing may alternatively include a door coupled to the opening. The door may be automatic or manual. The head includes the discharge nozzle positioned on a lower side thereof. The housing also includes a recess positioned below the head and the discharge nozzle for receiving a wine glass.

In another embodiment, a wine dispensing device includes a housing, an opening in the housing, a cutting mechanism, a Peltier cooler, a tube, and a discharge opening. The housing has a wine flow path therethrough. The opening in the housing is for receiving a flexible pouch 12 filled with wine. The cutting mechanism is for cutting or slicing open the pouch 12 to permit wine to vacate the pouch 12. The wine flows by gravity into a holder for catching the wine. The Peltier cooler is associated with the flow path and has a cooling surface. The tube couples the holder for moving wine from the holder to the Peltier cooler. The discharge opening is coupled to the Peltier cooler. Wine is pumped from the holder to an upper end of the Peltier cooler where it flows over the cooling surface and is discharged to the discharge opening.

The housing may include a receptacle for receiving the pouch 12. The receptacle may be coupled to the opening in the housing. The cutting mechanism may be coupled to the receptacle to permit cutting of the pouch 12 when the pouch 12 is positioned in the receptacle.

A plurality of fins may be operatively associated with the cooling surface of the Peltier cooler and the fins are likewise cooled by the Peltier cooler. The cooling surface may be positioned in the flow path and may have at least a partially vertical orientation.

The cutting mechanism may include a cutting blade and the cutting blade may be coupled to a motor that moves the blade in and out of contact with the pouch 12 to repeatedly cut and/or agitate the pouch 12. The movement of the cutting blade may cause aeration of the wine.

The receptacle may be coupled to a discharge bin. The device may include means for transferring a pouch 12 from the receptacle to the discharge bin.

The device may include a door coupled to the opening in the housing. The door closes the opening and is opening either manually operated or automatically operated.

The device may also include an activation button for turning the device on and for activating the dispensation of wine from the device.

The device may include a movable base member for seating a glass thereon. The base member may be movable to provide at least a first height for a first height glass and a second height for a second height glass. The base member may be configured to position a top end of the glass directly adjacent to the discharge opening of the device to deter splatter.

The device may also include a cooling system associated with the Peltier cooler for transferring heat away from the cooling surface of the Peltier cooler. The cooling system may include at least a cooling block, a pump, a fan and a radiator.

The device may also include a vessel for holding wine directly coupled to the Peltier cooler and a temperature sensor. The vessel may include a discharge opening that is coupled to a valve that opens and closes the discharge opening. The wine in the vessel may be retained in the vessel until cooled to a prescribed temperature as determined by the temperature sensor. Multiple Peltier coolers may be utilized in the device.

The term "substantially," if used herein, is a term of estimation.

While various features are presented above, it should be understood that the features may be used singly or in any combination thereof. Further, it should be understood that variations and modifications may occur to those skilled in the art to which the claimed examples pertain. The examples described herein are exemplary. The disclosure may enable those skilled in the art to make and use alternative designs having alternative elements that likewise correspond to the elements recited in the claims. The intended scope may thus include other examples that do not differ or that insubstantially differ from the literal language of the claims. The scope of the disclosure is accordingly defined as set forth in the appended claims.

What is claimed is:

1. A beverage dispensing device comprising:
   a housing having a flow path;
   a receptacle in the housing for receiving a package that contains a beverage to be released from the package into the receptacle, and for discharging the beverage into the flow path;
   means for opening the package to release the beverage therefrom into the flow path;
   a code reader that reads one or more codes on the package to determine a type of beverage in the package;
   a funnel placed in the flow path vertically below the receptacle;
   a thermoelectric cooler, positioned in the housing along the flow path after the receptacle and the funnel, for performing at least one of chilling and warming the beverage along the flow path based on the one or more codes read by the code reader;
   a tube extending from a bottom of the funnel to the thermoelectric cooler;
   an aeration component, coupled to the thermoelectric cooler, configured to aerate the beverage as it travels along the flow path, the aeration component comprising at least one row of a plurality of wavy projections;
   a discharge receptacle including at least one of further cooling and aerating features;
   a discharge nozzle coupled to the flow path for dispensing the beverage from the housing into a drinking vessel;
   a base member positioned in a recess below the discharge nozzle and configured to support the drinking vessel; and
   wherein the flow path is defined as follows:
   the flow path begins in the receptacle after the beverage is released into the receptacle from the package;
   the beverage flows from the receptacle into the funnel;
   the beverage flows from the funnel through the tube to the thermoelectric cooler; and
   the beverage flows from the thermoelectric cooler into the discharge receptacle and out through the discharge nozzle.

2. The device of claim 1, wherein the base member is configured to expand upwardly and contract downwardly to at least two variable heights.

3. The device of claim 2, wherein the adjustable base member comprises a base plate and a drip tray, the base plate being configured to be removable and replaceable at variable heights using one or more legs configured to lock into place within one or more openings within a wall of the recess.

4. The device of claim 2, wherein the adjustable base member comprises a base plate and a drip tray, the base plate being positioned on rails and being configured to be raised and lowered to a desired variable height until locked into place.

5. The device of claim 1, wherein the thermoelectric cooler is a Peltier cooler coupled to a cooling system.

6. The device of claim 5, wherein the cooling system comprises one or more of a pump, a valve, a cooling block, a radiator, and cooling fluid circulating through a radiator.

7. The device of claim 1, wherein the plurality of wavy projections extends outwardly from a cooling surface of the thermoelectric cooler such that the beverage flows through and around the plurality of wavy of projections, creating turbulence and aeration of the beverage.

8. The device of claim 1, further comprising activation hardware and software for activating the device to cool and dispense the beverage from the beverage container.

9. The device of claim 1, wherein the housing comprises a head having a top surface having an opening for receiving the beverage container, with the opening being coupled to the receptacle.

10. The device of claim 1, wherein the beverage comprises wine and the code reader is configured to read a code indicating whether the wine in the package is red wine or white wine.

11. The device of claim 1, further comprising a decanter coupled to the flow path for filtering and providing additional aeration of the beverage.

12. The device of claim 1, further comprising a filtering mechanism coupled to the flow path for clarifying and filtering the beverage.

13. The device of claim 1, further comprising a water reservoir positioned inside the housing and configured to hold water for rinsing the device.

14. A beverage dispensing device comprising:
    a housing having a flow path;
    a receptacle in the housing for receiving a beverage container that houses a beverage to be released from the beverage container into the receptacle, and for discharging the beverage into the flow path;
    means for opening the beverage container to release the beverage therefrom into the flow path;
    circuitry that receives one or more settings varying a serving temperature range of the beverage;
    a funnel placed in the flow path vertically below the receptacle;
    a thermoelectric cooler positioned in the housing along the flow path after the receptacle and the funnel, the thermoelectric cooler performing at least one of chilling and warming the beverage along the flow path based on the one or more settings;
    a tube extending from a bottom of the funnel to the thermoelectric cooler;

an aeration component coupled to the thermoelectric cooler, the aeration component being configured to aerate the beverage as it travels along the flow path, the aeration component comprising at least one row of a plurality of wavy projections;

a discharge receptacle including at least one of further cooling and aerating features;

a discharge nozzle coupled to the flow path for dispensing the beverage from the housing into a drinking vessel;

a plurality of interchangeable base members, each of the plurality of base members comprising a different height and configured to be positioned in a recess below the discharge nozzle and to support the drinking vessel; and wherein the flow path is defined as follows:

the flow path begins in the receptacle after the beverage is released into the receptacle from the beverage container;

the beverage flows from the receptacle into the funnel;

the beverage flows from the funnel through the tube to the thermoelectric cooler; and the beverage flows from the thermoelectric cooler into the discharge receptacle and out through the discharge nozzle.

15. The device of claim 14, wherein each of the plurality of base members is configured to be locked into place within one or more openings within a wall of the recess using one or more legs.

16. The device of claim 14, wherein the thermoelectric cooler is a Peltier cooler coupled to a cooling system, and wherein the cooling system comprises one or more of a pump, a valve, a cooling block, a radiator, and cooling fluid circulating through the radiator.

17. The device of claim 14, further comprising a decanter coupled to the flow path for filtering and providing additional aeration of the beverage.

18. A beverage dispensing device comprising:

a housing having a flow path;

a receptacle in the housing for receiving a beverage container that houses a beverage to be released from the beverage container into the receptacle, and for discharging the beverage into the flow path;

means for opening the beverage container to release the beverage therefrom;

circuitry that receives one or more settings varying a serving temperature range of the beverage;

a funnel placed in the flow path vertically below the receptacle;

a thermoelectric cooler positioned in the housing along the flow path after the receptacle and the funnel, the thermoelectric cooler performing at least one of chilling and warming the beverage along the flow path based on the one or more settings;

a tube extending from a bottom of the funnel to the thermoelectric cooler;

an aeration component coupled to the thermoelectric cooler, the aeration component being configured to aerate the beverage as it travels along the flow path, the aeration component comprising at least one row of a plurality of wavy projections;

a decanter coupled to the flow path configured to filter and aerate the beverage;

a discharge receptacle including at least one of further cooling and aerating features;

a discharge nozzle coupled to the flow path for dispensing the beverage from the housing into a drinking vessel;

an adjustable base member positioned in a recess below the discharge nozzle and configured to support the drinking vessel at a desired variable height;

a water reservoir positioned inside the housing and configured to hold water for rinsing the device; and wherein the flow path is defined as follows:

the flow path begins in the receptacle after the beverage is released into the receptacle from the beverage containers the beverage flows from the receptacle into the funnel;

the beverage flows from the funnel through the tube to the thermoelectric cooler;

the beverage flows from the thermoelectric cooler into the decanter; and the beverage flows from the decanter to the discharge receptacle and out through the discharge nozzle.

19. The device of claim 18, wherein the thermoelectric cooler is a Peltier cooler coupled to a cooling system and wherein the cooling system comprises one or more of a pump, a valve, a cooling block, a radiator, and cooling fluid circulating through a radiator.

20. The device of claim 18, wherein the plurality of wavy projections extends outwardly from a cooling surface of the thermoelectric cooler such that the beverage flows through and around the plurality of wavy of projections, creating turbulence and aeration of the beverage.

* * * * *